United States Patent
Akiyama

(10) Patent No.: US 7,499,911 B2
(45) Date of Patent: Mar. 3, 2009

(54) METHOD OF SEARCHING FOR, COLLECTING AND DISTRIBUTING INFORMATION IN DISTRIBUTED COMPUTER

(75) Inventor: Ryuhei Akiyama, Tokyo (JP)

(73) Assignee: Viewpoint Communications, Inc., Tokoyo (JP)

( * ) Notice: Subject to any disclaimer, the term of this patent is extended or adjusted under 35 U.S.C. 154(b) by 174 days.

(21) Appl. No.: 10/406,072

(22) Filed: Apr. 3, 2003

(65) Prior Publication Data

US 2004/0019657 A1    Jan. 29, 2004

Related U.S. Application Data

(63) Continuation of application No. PCT/JP00/06888, filed on Oct. 3, 2000.

(51) Int. Cl.
G06F 17/30 (2006.01)

(52) U.S. Cl. .......................................................... 707/3

(58) Field of Classification Search ............... 707/1–10, 707/100–104.1, 200–205
See application file for complete search history.

(56) References Cited

U.S. PATENT DOCUMENTS

| | | | |
|---|---|---|---|
| 4,477,881 A | | 10/1984 | Kobayashi et al. |
| 5,754,939 A | * | 5/1998 | Herz et al. .................. 455/3.04 |
| 5,794,210 A | * | 8/1998 | Goldhaber et al. ............ 705/14 |
| 5,826,261 A | * | 10/1998 | Spencer ........................... 707/5 |
| 6,038,560 A | | 3/2000 | Wical |
| 6,041,311 A | * | 3/2000 | Chislenko et al. ............. 705/27 |
| 6,356,879 B2 | * | 3/2002 | Aggarwal et al. ............. 705/26 |
| 6,374,237 B1 | * | 4/2002 | Reese ............................. 707/3 |
| 6,438,579 B1 | * | 8/2002 | Hosken ....................... 709/203 |
| 2001/0047349 A1 | * | 11/2001 | Easty et al. .................... 707/3 |
| 2002/0128907 A1 | * | 9/2002 | Sato et al. ..................... 705/14 |

FOREIGN PATENT DOCUMENTS

| | | |
|---|---|---|
| JP | 05-227204 | 9/1993 |
| JP | 09-081630 | 3/1997 |
| JP | 09-171450 | 6/1997 |
| JP | 10-83386 | 3/1998 |
| JP | 10-275119 | 10/1998 |
| JP | 11-252533 | 9/1999 |
| JP | 11-265400 | 9/1999 |
| JP | 2000-076301 | 3/2000 |
| JP | 2000-155786 | 6/2000 |
| JP | 2000-172722 | 6/2000 |
| JP | 2000-207383 | 7/2000 |
| JP | 2000-207458 | 7/2000 |
| JP | 2007-154495 | 1/2008 |
| KR | 2000-0037383 | 7/2000 |

* cited by examiner

Primary Examiner—Hosain T Alam
Assistant Examiner—Navneet K Ahluwalia
(74) Attorney, Agent, or Firm—Alston & Bird LLP

(57) ABSTRACT

Information control techniques capable of storing information from information providers distributedly and arbitrarily collecting information related to a desired subject. An information processor being in cooperation with other information processors connected with a network, comprising an operating unit for preparing information related to a desired subject, recording units for recording the information, a communication unit for communicating with other information processors connected with a network, and a control unit, the control unit, on receiving a subject-specified inquiry from other first information processor, retrieves information matching the inquiry in the recording units and sends back the matched information to a specified receiving party.

35 Claims, 30 Drawing Sheets

FIG. 4

| CATEGORY OF COMMERCIAL ARTICLE | MAKER | MAJOR CLASSIFICATION | INTERMEDIATE CLASSFICATION | MINOR CLASSIFICATION | NAME OF COMMERCIAL ARTICLE | PHOTO |
|---|---|---|---|---|---|---|
| CAR | TOYO | PRIVATE CAR | POPULAR CAR | WAGON | CALLOT WAGON CODE NO. 0000000 | |

FIG. 5

| |
|---|
| NAME OF COMMERCIAL ARTICLE     COMMERCAL ARTICLE CODE NO. |
| PURCHASE TIME |
| PURCHASE PLACE |
| PURCHASE PRICE |
| PURCHASE FREQUENCY |
| EVALUATION |
| DEGREE OF SATISFACTION |
| INTENTION OF PURCHASE OF NEXT TIME |
| IMPRESSION (FA) |

FIG. 6
| CATEGORY OF COMMERCIAL ARTICLE | FACTOR | | | |
|---|---|---|---|---|
| CAR | FAMILY MEMBERS | BRAND IMAGE | ANNUAL INCOME | ... |
| | THREE PEOPLE | X-COMPANY | OOOYEN | ... |
| BEER | TASTE | BRAND IMAGE | TV WATING TIME | ... |
| | FAVORITE OF ALCOHOLIC BEVERAGES | S-BEER | THREE HOURS | ... |
| NEWSPAPER | JOB | ACADEMIC BACKGROUND | HOMETOWN | ... |
| | BANK CLERK | GRADUATE FROM UNIVERSITY | TOKYO | ... |
| ... | ... | | | ... |
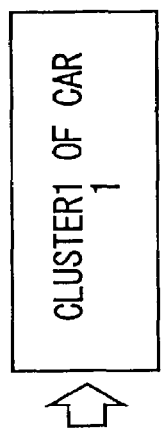
CLUSTER1 OF CAR
1
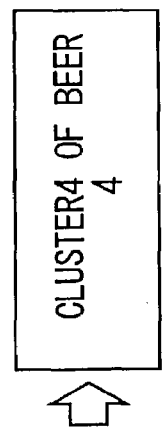
CLUSTER4 OF BEER
4
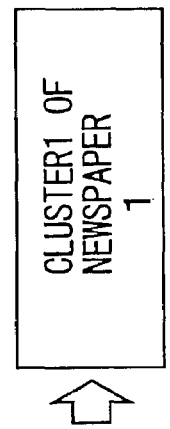
CLUSTER1 OF NEWSPAPER
1

FIG. 22

| IDENTIFIER | QUERY ID | TTL | CLUSTER NUMBER | THEME |
|---|---|---|---|---|
| | SITE QUERY COMMAND (MODIFICATION) | | | | ns

METHOD OF SEARCHING FOR, COLLECTING AND DISTRIBUTING INFORMATION IN DISTRIBUTED COMPUTER

CROSS-REFERENCE TO RELATED APPLICATION

This application is a continuation of International Patent Application No. PCT/JP00/06888 filed Oct. 3, 2000, currently pending, which designated inter alia the United States.

FIELD OF THE INVENTION

The present invention relates to a technology of managing information in distribution.

BACKGROUND OF THE INVENTION

Over the recent years, with advancements of the Internet, consumers have come to collect pieces of information on commercial articles, purchase the commercial articles or sell the commercial article possessed on hand.

An information exchange on a network such as the Internet, etc., has hitherto involved the use of a chat site and a bulletin board system. This type of site is provided with and retains pieces of information such as article evaluations, opinions, comments, etc., created online or offline by users.

The user provides those categories of information on one hand and is provided with information from other user on the other hand. Thus, the consumers having an interest in a certain specified theme, e.g., an evaluation about a certain commercial article, have been exchanging the information with each other.

In this type of system, however, even when the user trying to exchange the information makes a query, the user must wait till an answer is given from another user. On the other hand, even when the other user gives the answer at last, there might be a case where a query originator user gives up receiving an answer at that point in time. Thus, the conventional system required synchronization to some extent between the query originator user and the respondent user.

Further, in the chat site and the bulletin board site described above, the information provided from the information provider is transferred as-is to the information recipient. Hence, there was a case where the information provided is not necessarily matched with the information required.

That is, if characteristics of the information provider in terms of a factor contributing to a selection of the commercial article are not similar to characteristics of the information recipient, the information recipient could not obtain the information suited to this recipient. For example, when obtaining information on a degree of satisfaction with an automobile, there might a case where the result of the same type car differs depending on whether the answerer is single or has a family.

Further, for instance, there is a correlation between a house-owner-oriented consumer having a high interest in pets and a house-renter-oriented consumer having a low interest in the pets. Thus, even if collecting the information without considering the factor contributing to the selection of the commercial article, there was a case in which the information collected does not invariably become effective information.

Moreover, for transmitting the information described above, as in viral communications, there was a case of utilizing such an information transmission system that an information originator is paid a fee corresponding to the number of persons to which, e.g., an E-mail is distributed.

This type of system, however, had a case where the E-mail is forcibly distributed, which might encroach upon a privacy of the user. Moreover, participants in this system must artificially distribute the E-mails, and hence the system spontaneously disappears. There was rarely a long duration of the system.

Further, there have hitherto been conducted sales of the commercial articles as by net auctions, etc., by furthering the information exchange described above. In the sales on the network also, when the seller indicates an intention of providing a commercial article, a purchaser is required to indicate an intention of consent within a predetermined period of time. Reversely, when the purchaser indicates an intention of purchasing the commercial article, the seller is required to indicate an intention of consent within a predetermined period of time.

According to the commercial article sales system conducted so far on the Internet, an optimal purchaser does not necessarily answer within the sales period indicated by the seller in, e.g., the net auction, etc. Herein, the optimal purchaser is a person who purchases the commercial article concerned at a maximum price.

Accordingly, it might happen that the user who requires this commercial article most and should purchase it at the maximum price fails to access by accident the sales site of this commercial article.

Similarly, when the wish-to-purchase person of the commercial article indicates the intention of purchasing the commercial article, the seller is required to indicate the intention of consent within the predetermined period. Herein also, an optimal seller does not necessarily answer within a purchase period shown by the wish-to-purchase person. Herein, the optimal seller is a person who sells the commercial article concerned at a minimum price.

SUMMARY OF THE INVENTION

It is an object of the present invention, which was devised in view of the problems inherent in the prior art described above, to provide an information management technology capable of accumulating information in distribution which is given from an information provider, and collecting pieces of information on a desired theme at any time.

To accomplish the above object, the present invention adopts the following means.

A readable-by-computer recording medium is recorded with a program for making a computer execute a step (S22) of receiving a query with a designated theme, from a other first computer connected to a network, a step (S233) of searching for information coincident with the query, and a send-back step (S235) of sending the information coincident with the query back to a predetermined response destination, whereby the computer manages the information in distribution.

Preferably, the query may contain transfer control information (TTL) for controlling transferability of the query, and this program may make the computer further execute a step (S236) of updating the transfer control information under a predetermined condition, a step (S237) of judging based on the transfer control information whether the transfer of query can be permitted or not, and a step (S238) of transferring, when the transfer is permitted, the query to one or more second computers.

Preferably, this program may make the computer further execute a step (S7) of inputting information on a desired theme or a step of defining an accumulation area for inputting the information on the desired theme.

Preferably, the send-back step may involve sending, as a substitute for the information coincident with the query, a location of the information coincident with the query.

Preferably, this program may make the computer further execute a step (S24) of receiving the response to the query from the second computer, and a step (S25) of sending the received response back to the predetermined response destination.

Preferably, the response destination may be the first computer.

Preferably, the query may contain information for specifying the response destination, and the response destination may be a query originator computer (11) originating the query first.

Preferably, the response destination may be an administration computer (10) requested to distribute the query to the other computer by the query originator computer originating the query first, and starting such a distribution.

Preferably, the theme may be a user's evaluation about a commercial article.

Preferably, the query may contain characteristic information of a query originator user related to a purchase of the commercial article, the program may make the computer further execute a step of referring to the characteristics of a respondent user, and a step (S23a) of judging whether the respondent user is coincident with the characteristic information or not, and the send-back step involves not sending an evaluation of the respondent user who is not coincident with the characteristic information.

Preferably, the program may make the computer further execute a step (S7, S69) of generating the query, and a receiving step (S10, S6b) of receiving a response to the query.

Preferably, the program may make the computer further execute a step (S7, S69) of requesting the administration computer (10) to start distributing the thus generated query.

Preferably, the receiving step may involve receiving the response from the administration computer (10).

Preferably, the receiving step may involve receiving the response from a computer having information coincident with the query.

Preferably, this program may make the computer further execute a step (S6b) of totaling the responses.

Preferably, the information may be a result of the user's evaluation about the commercial article, and the program may make the computer further execute a step (S4541) of referring to the characteristic information of the query originator user related to the purchase of the commercial article, a step (S4541) of judging whether or not the respondent user is coincident with the above characteristic information, and a step (S6b) of totaling the responses of the respondent users coincident with the above characteristic information.

Preferably, the query may be an offer of selling a specified commercial article, and the information may be a price in the case of purchasing the commercial article concerned.

Preferably, this program may make the computer further execute a step (S70) of generating the query, a step (S70) of receiving a response to the query, and a step (S72) of selecting only a predetermined number of responses in sequence from the highest price down to the lowest.

Preferably, the query may be an offer of purchasing a specified commercial article, and the information may be a price in the case of selling the commercial article concerned.

Preferably, the program may make the computer further execute a step (S80) of generating the query, a step (S80) of receiving a response to the query, and a step (S82) of selecting only a predetermined number of responses in sequence from the lowest price to the highest.

Further, a readable-by-computer recording medium is recorded with a program for making a computer distribute a query to other computer on a network and execute a step (S42) of receiving a query distribution request for distributing the query to other distribution destination computer from a query originator computer generating the query, a step (S435) of determining the distribution destination computer, and a distribution step (S436) of distributing the query to the determined distribution destination computer.

Preferably, if the distribution destination computer transfers the query to still other transfer destination computer, the distribution step (S436) may involve distributing transfer control information for controlling transferability of the query together with the query and eliminating a limitless transfer of the query.

Preferably, the distribution step (S435a) may involve distributing the query to a plurality of distribution destinations on the basis of a multicast address.

Preferably, the program may make the computer further execute a step (S44) of receiving a response to the query, and a step (S4545) of sending the response back to the query originator computer.

Preferably, the program may make the computer further execute a step (S44) of receiving the responses to the query, a totaling step (S4541) of totaling the responses and generating total information, and a step (S4545) of sending the total information back to the query originator computer.

Preferably, the program may make the computer further execute a step (S44) of receiving a response to the query, a step of generating an anonymous response by deleting the information for specifying an individual from the response, and a step of sending the anonymous response back to the query originator computer.

Preferably, the information may be a result of the user's evaluation about the commercial article, and the program may make the computer further execute a step (S4541) of referring to characteristic information of the user of the query originator computer with respect to the purchase of the commercial article, a step (S4541) of judging whether or not the respondent user is coincident with the above user characteristic information and a totaling step (S4541) of totaling responses of the respondent users coincident with the above characteristic information.

Preferably, the distribution step may involve designating the query originator computer as a response destination for the distribution destination computer, and having the response directly given to the query originator computer from the distribution destination computer or the transfer destination computer.

Preferably, the query may be an offer of selling a specified commercial article, the information may be a price in the case of purchasing the commercial article, and the totaling step (S4541) may include a step (S72) of selecting only a predetermined number of responses in sequence from the highest price down to the lowest.

Preferably, the query may be an offer of purchasing a specified commercial article, the information may be a price in the case of selling the commercial article, and the totaling step (S4541) may include a step (S82) of selecting only a predetermined number of responses in sequence from the lowest price to the highest.

Further, according to the present invention, there is provided a data communication signal containing a program code module for actualizing any one of the functions described above.

Furthermore, according to the present invention, an information processing device (11a, etc.) cooperating with other information processing device (11b, etc.) connected to a network, comprises an operation unit (16) for creating information related to a desired theme, a recording unit (13, 14) for recording the above information, a communication unit (17) for communicating with the other information processing device connected to the network, and a control unit (12), wherein the control unit (12), when receiving the query with the theme designated from the other first information processing device (11)(S22), searches for the information coincident with the query on the recording unit (S233), and sends the information coincident with the query back to a predetermined response destination (S235).

Moreover, according to the present invention, there is provided an information management processing system, configured by a plurality of information processing devices (11, 11a, 11b) on a network, for managing information in distribution, the information processing device (11, 11a, 11b) comprising a communication unit (17) for communicating with other information processing device connected to a network, and a control unit (12), wherein the control unit (12) receives a query with a theme designated from other first computer (11a) connected to the network, searches for information coincident with the query, and sends the information coincident with the query back to a predetermined response destination.

Further, according to the present invention, an information collecting method of distributing information to a computer on a network, for storing information in distribution, and making the computer respond to the query, comprises a step (S42) of receiving a request for distribution from a query originator computer generating the query related to a desired theme, a step (S435) of determining a query distribution destination computer, and a step (S436) of distributing the query to said distribution destination computer.

BRIEF DESCRIPTION OF THE DRAWINGS

FIG. 4 shows a list of commercial articles displayed on a Web page by the viral search site 10 shown in FIG. 1;

FIG. 5 is a format of a questionnaire file downloaded from the Web page by the participant member in the viral search site 10;

FIG. 6 is an explanatory diagram showing clusters for categorizing customers on the basis of consumption characteristics of the customers for every commercial article;

FIG. 22 is a diagram showing a data structure of a site query command in a fourth modified of the first embodiment;

DETAILED DESCRIPTION OF PREFERRED EMBODIMENTS

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

First Embodiment

An information management system in a first embodiment of the present invention will be explained with reference to the drawings in FIGS. 1 through 23.

<System Architecture and Outline of Functions>

Figure 1:
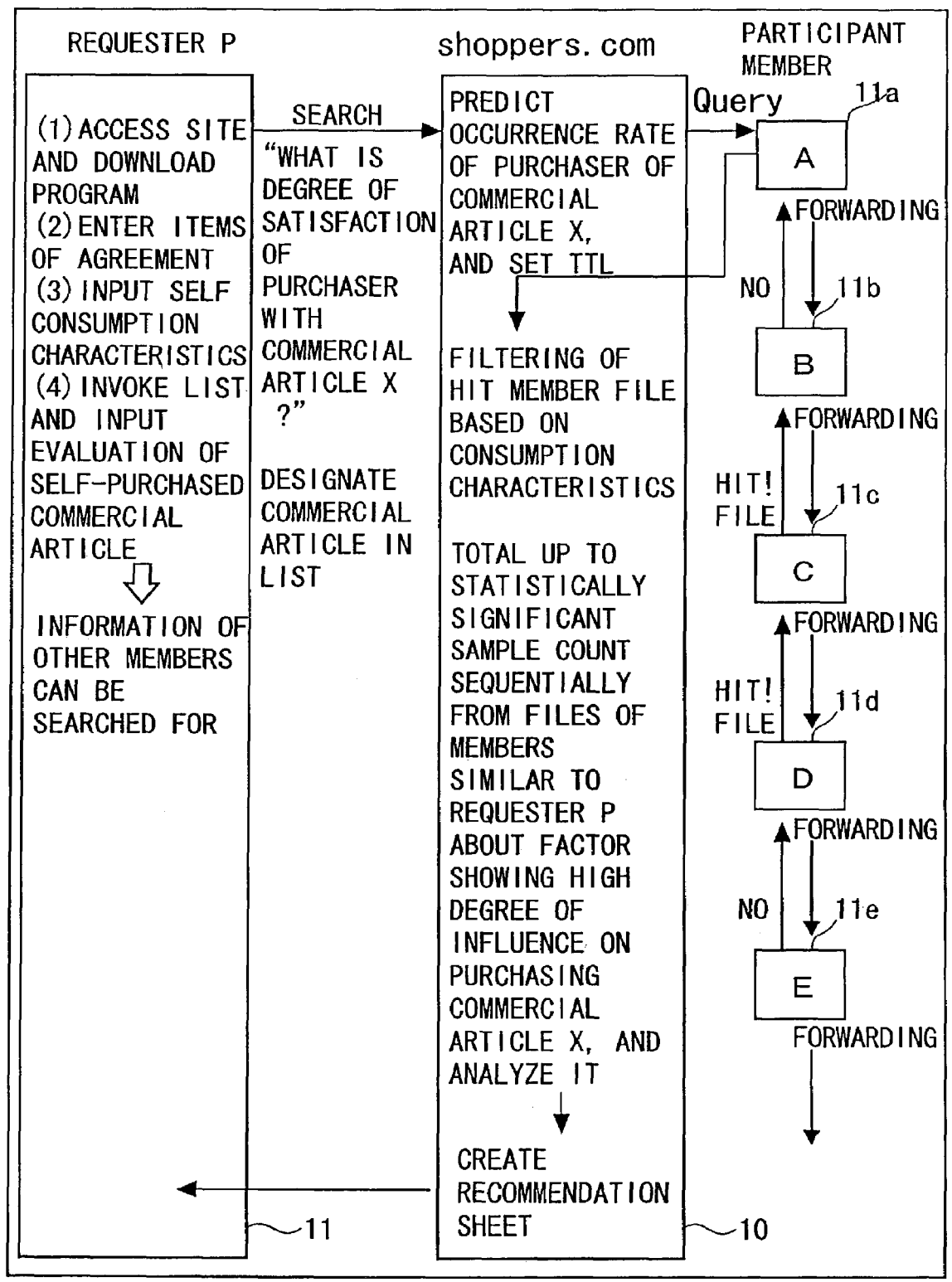
FIG. 1 is a diagram showing a system architecture of an information management system.

FIG. 1 shows a system architecture of an information management system. This system is configured by a virtual word-of-mouth (viral communication) search site "shopper.com"

(which hereinafter will be called a viral search site 10) on the Internet, and host computers (which hereinafter will be referred to as participant hosts 11a, etc.) used by participant members A, B, C, D, E, etc., in the viral search site 10.

Among the participant hosts 11a, etc., particularly the participant host making a request for searching is termed a requester host 11. Further, a party that requests the viral search site 10 to search is called a requester P. Moreover, according to this embodiment, the search request is also termed a query. An outline of processes in this system will hereinafter be described.

[Outline of Operation Process on Requester Host 11]

(1) The requester P, to start with, accesses the viral search site 10 from the requester host 11, and downloads an information processing program. This information processing program provides a communication function with other participant hosts 11a, etc., and a data management function.

(2) Further, the requester P enters an acknowledgement about agreed items for becoming a member of the viral search site 10 and registers in the viral search site 10. Herein, the agreed items are, for instance, such items that the members shall neither make any false answers nor sell other members' information, and so forth.

(3) Moreover, the requester P inputs requester's own characteristics for consumption and saves them on the requester host 11. Herein, the characteristics for consumption are pieces of information for categorizing the requester P in terms of purchasing behaviors, and are, e.g., a distinction of sex, age, family members, address, job, income, etc.

(4) Still further, the requester P invokes a commercial article list retained by the viral search site 10 and inputs an evaluation about a self-purchased commercial article. This evaluation is saved as a questionnaire file on a local disk of the requester host 11. If there is no commercial article that can be evaluated by the requester P, however, this setting is omitted.

After the initial setting described above, the requester P is able to query other members. This query is, for example, "What is a degree of satisfaction of the purchaser about a commercial article X ?". For this query, the requester P selects the commercial article X from the commercial article list retained by the viral search site 10, designates a degree of satisfaction as a search item and may thus make a request for searching.

According to this embodiment, the query sent from the requester host 11 to the viral search site 10 is called a requester query. Further, a query distributed from the viral search site 10 to other participant hosts 11a is referred to as a site query.

[Outline of Processes on Viral Search Site 10 and Participant Hosts 11a]

The viral search site 10 executes the following processes about the query given from the requester host 11. At first, the viral search site 10 predicts an occurrence rate of the purchasers of the commercial article X and sets a TTL (Time-to-Live). The TTL is defined as a parameter for controlling forwarding the query from the participant host 11a in the viral search site 10 to other participant hosts 11b. Each time the query is forwarded, the TTL is decremented. When the TTL comes to 0, this query is not forwarded.

Note that "forwarding" is a transfer of the search request from the participant host 11a to other participant host 11b. Accordingly, for instance, when the TTL is set to 25, the query is forwarded twenty five times between the participant hosts 11a and so on.

Next, the viral search site 10 distributes the query to one or more participant hosts 11a, etc., which have previously established peer-to-peer connections to each other.

In response to this query, the participant host 11a, etc., at first refers to within the self local disk and searches for an answer to the query, for example, the information describing the degree of satisfaction of the purchaser about the commercial article X. If this answer exists within the local disk, the participant host 11a, etc., sends this answer together with the member's consumption characteristics (which will hereinafter simply be termed "the answer, etc.") recorded on the participant host 11a, etc., back to the viral search site 10. These answers, etc., are recorded as a file on the local disk and therefore described as the file in FIG. 1.

Further, the participant host 11a, etc., decrements the TTL by 1 and, if the TTL is larger than 0, forwards the query to the one or more participant hosts 11b, etc., which have previously established the peer-to-peer-connections to each other.

If the answer to this query exists on the local disk of the participant host 11b, etc., the participant host 11b, etc., sends the answer, etc., back to the forwarding source. As shown in FIG. 1, the query is forwarded sequentially from the participant host 11a, etc., to other participant host 11b, etc., till the TTL comes to 0. Further, the answer, etc., is sent back via a path reversed to the forwarding.

Thus, in the case of finding out the answer to the query forwarded, the answer and the member's consumption characteristics related to this answer are collected by the viral search site 10. Then, the viral search site 10 compares the consumption characteristics contained in the collected answer, etc., with the consumption characteristics of the requester P. Then, the answer effective in creating recommendation information for the requester P is filtered in the way which follows.

The viral search site 10 previously determines by a statistical analysis a factor exhibiting a high degree of influence on purchasing the commercial article for each of the commercial articles in the commercial article list. Such a factor is obtained by statistically analyzing, for instance, a result of questionnaire to the customers.

The questionnaire is concerned about, for example, the customer's consumption characteristics such as the distinction of sex, age, family members, address, job, income, a brand image held about each brand, etc., an actual purchase pattern of the customer, and so on.

The viral search site 10 executes the statistical analyses such as a main component analysis, a regression analysis and a cluster analysis etc., with respect to the result of the questionnaire described above, thereby determining the factor exhibiting the high degree of influence with respect to the purchase pattern of each of the commercial articles.

The viral search site 10 collects the answers of the members having their consumption characteristics, similar to the consumption characteristics of the requester P, in the factor exhibiting the high degree of influence on purchasing the commercial article X. The answer collection is conducted till a statistically significant sample count (a predetermined value) is reached.

The viral search site 10 estimates a degree of satisfaction of the purchaser of the commercial article X from the thus collected answers, then creates the recommendation information (a recommendation sheet) and sends this recommendation sheet to the requester P.

<Processes of Viral Search Site 10>

Figure 2:
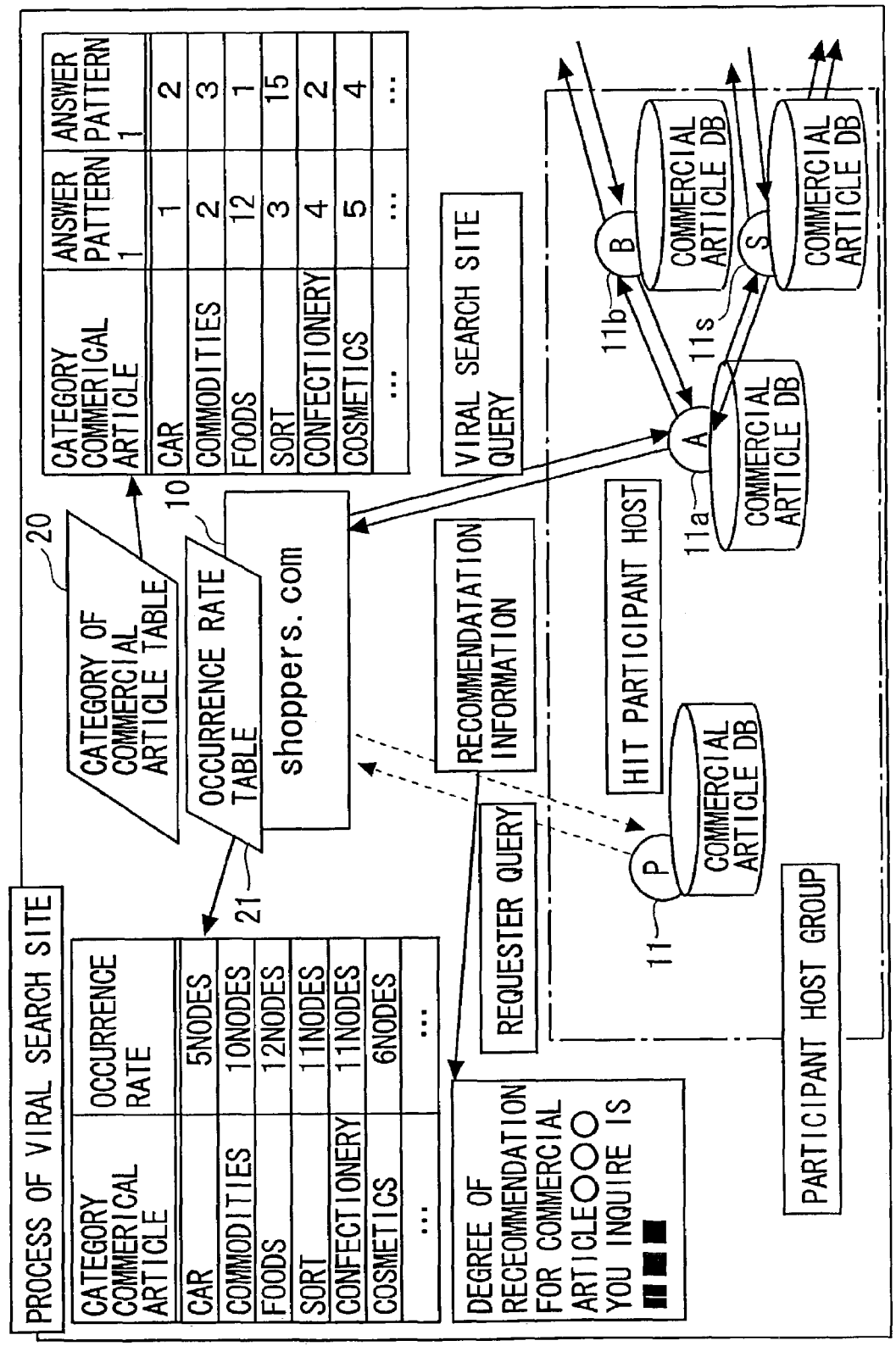
FIG. 2 is a diagram showing an outline of processing of a viral search site 10 shown in FIG. 1.

FIG. 2 shows a diagram of an outline of processes of the viral search site 10. As shown in FIG. 2, the viral search site 10 executes the following functions.

(1) Creation of Cluster of Consumers

The viral search site 10 previously creates, based on a research for the commercial articles and consumer information, a cluster for categorizing the consumers. The viral search site 10 categorizes the consumption characteristics of the consumers for every commercial article, and assigns a cluster thereto.

A commercial article category based category table 20 retains a set of clusters of each commercial article as answer patterns. For instance, the consumers belonging to an answer pattern 1 are recorded such as an automobile cluster 1, a commodities cluster 2 and a food cluster 12.

(2) Setting of TTL

The viral search site 10 has a consumer-based commercial article possession rate according to the commercial article category from the research conducted beforehand. Then, the viral search site 10 records information of how many times the query forwarding is repeated in an occurrence rate table 21 for every commercial article category, based on the commercial article possession rate.

(3) Site Query

The viral search site 10, upon receiving a requester query command from the requester host 11, sets the TTL based on the occurrence rate table, and issues a site query command to the ambient participant hosts 11a, etc.

(4) Filtering

Next, the viral search site 10 receives an answer to the site query from the participant host 11a, etc. This answer is a result of searching for the information coincident with the query by the participant host 11a, etc., and is therefore called a hit.

Next, the viral search site 10 selects an answer of the participant A, etc., of which the cluster is coincident with the cluster of the requester P with respect to the query target commercial article. This selection process is called "filtering".

(5) Collection of Evaluations

The viral search site 10 collects the evaluations about the commercial article from the answer filtered in the process (4).

(6) Send-back of Recommendation Information

The viral search site 10 sends the recommendation information back to the requester host 11 that has issued the requester query on the basis of the process (5).

<Process of Participant Host 11a, etc.>

Figure 3:
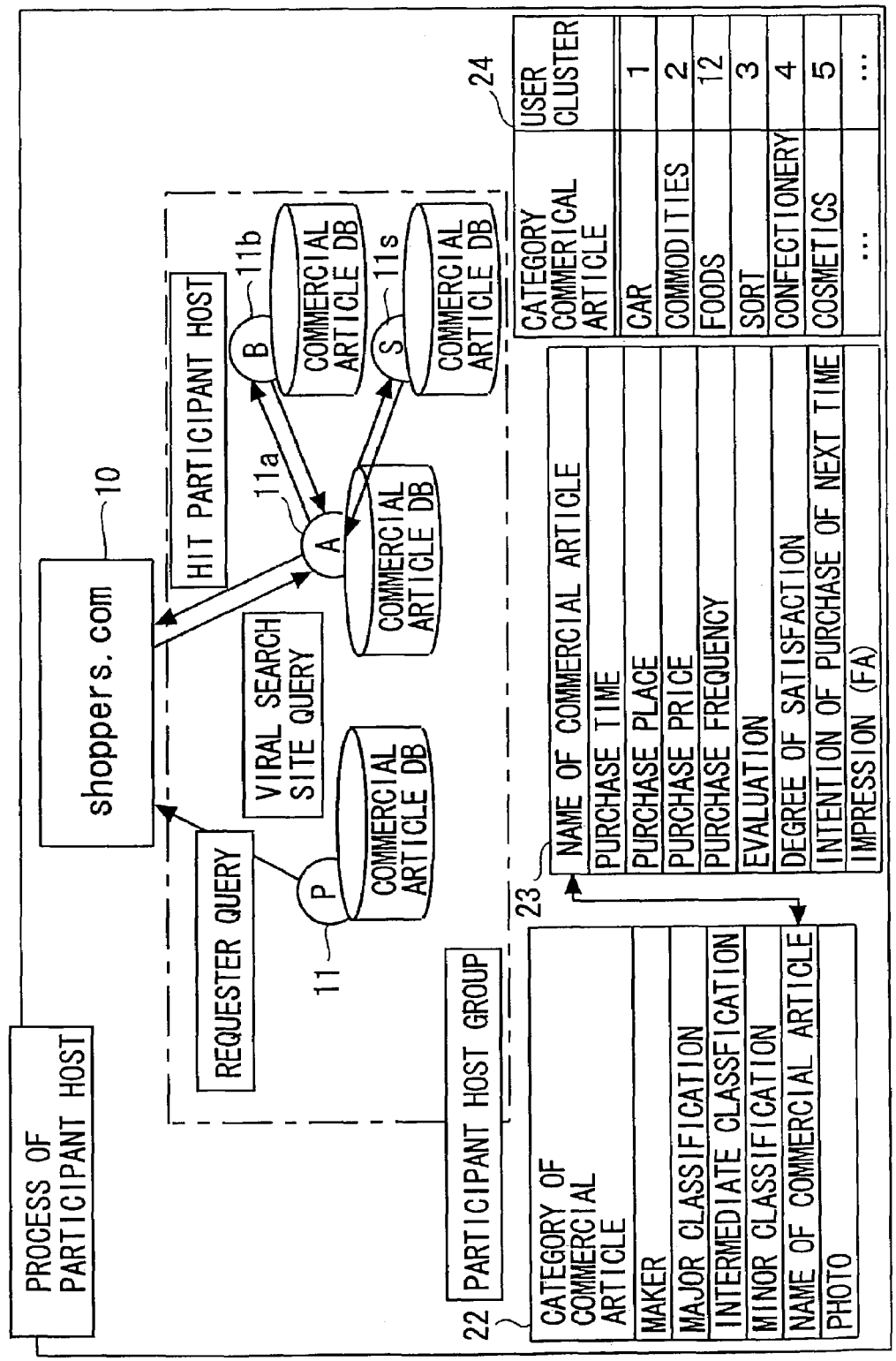
FIG. 3 is a diagram showing an outline of processing of a host of a participant member (which will hereinafter be simply called a participant host) 11a in "shoppers.com" shown in FIG. 1.

FIG. 3 shows an outline of a process of the participant host 11a, etc.

(1) Each of the participant hosts 11a, etc., has basic characteristic data (which are called demographic data), e.g., a distinction of sex, an age (or a date of participant's birth), a job and a participant's residence place (e.g., a post code) of the participant A, etc.

Further, each of the participant hosts 11a, etc., has detailed characteristic data, e.g., tastes, opinions, favorite brands, etc., of the participant A and so on. The detailed characteristic data are, however, inputted only when the participant concerned consents to inputting.

(2) Each of the participant hosts 11a, etc., provides a function of inputting the commercial article purchased by the user and the evaluation about this commercial article. Each of the participant hosts 11a, etc., records a result of this input in a commercial article purchase result record 23. The commercial article purchase result record 23 consists of records each containing a name of commercial article, a purchase time, a purchase place, a purchase price, a purchase frequency, an evaluation, a degree of satisfaction, an intention of next purchase and an impression.

(3) Each of the participant hosts 11a, etc., has a commercial article category table 22 and a user cluster definition table 24. The commercial article category table 22 consists of records each containing a commercial article category, a maker, a major classification, an intermediate classification, a minor classification, a name of commercial article and a pointer to image data of a photo.

As shown in FIG. 3, the commercial article category table 22 is linked via the name of commercial article to the commercial article purchase result record 23.

The user cluster definition table 24 consists of a commercial article category and a set of clusters to which the user in this commercial article category belongs. The viral search site 10 creates the user cluster definition table 24 on the basis of the basic characteristic data or the detailed characteristic data inputted by the requester P. Then, the requester P downloads and stores the requester's own user cluster definition table 24 on the requester host 11.

(4) Each of the participant hosts 11a, etc., provides the user with a function of previously inputting to the questionnaire.

(5) Each of the participant hosts 11a, etc., generates an answer pattern on the basis of the data of the questionnaire. Then, each of the participant hosts 11a, etc., determines the user cluster according to the commercial article category and stores the user cluster in the user cluster definition table 24.

(6) The requester host 11 sends the requester query command containing the following information to the viral search site 10 in order to search for the commercial article evaluations held by other participant hosts 11a, etc., and the cluster of the participant concerned.

A: Registration Number of Requester;

B: Commercial article that the requester wishes to purchase; and

C: Cluster to which the requester belongs with respect to the commercial article concerned.

The viral search site 10, upon receiving the requester query command, generates the site query command and distributes this command to the participant hosts 11a, etc.

(7) The participant hosts 11a, etc., searches through the commercial article purchase result record 23 and the user cluster definition table 24 in response to the site query command, and sends an answer containing the following information back to the viral search site 10.

A: Evaluation about the query commercial article; and

B: Cluster of the participant who evaluates that commercial article.

(8) The participant hosts 11a, etc., forwards the site query command to other participant hosts 11b, etc. The other participant hosts 11b, etc., similarly send answers back to the sending source of the site query command. Further, the other participant hosts 11b, etc., forward the site query command to still other participant hosts 11c, etc.

<Commercial Article List>

FIG. 4 shows a structure of the commercial article list provided from the viral search site 10. Each line in this commercial article list consists of a commercial article category, a maker, a major classification, an intermediate classification, a minor classification, a name of commercial article and a photo.

The commercial article category is a classification of commercial articles such as a automobile, cosmetics, beer, etc. The maker is a maker of the commercial article. The major, intermediate and minor classifications are ranges of the classification of the commercial article in the commercial article category.

For instance, the major classification shows a privately-owned car, a car for business use, etc. Further, the intermediate classification shows a popular car, a high-grade car, etc. Moreover, the minor classification shows, for example. a wagon, a sedan, a van, etc.

The name of commercial article is a name of the commercial article concerned. Further, the photo is an image formed by capturing the commercial article concerned. The requester P designates a desired commercial article from the thus structured commercial article list and makes a request for retrieving a desired item, for instance, a degree of satisfaction of the user. It is to be noted that the information item to be searched for is designated by selecting from an unillustrated search item list.

<Questionnaire File>

FIG. 5 shows a format of the questionnaire file for saved on the local disk by the requester P or the member of the viral search site 10. This questionnaire file format is displayed when the requester P, etc., accesses the viral search site 10. The requester P, etc., after inputting necessary items into respective fields, stores contents thereof on the hard disk 14.

This questionnaire file contains a name of commercial article, a commercial article code No. (type number), a purchase time, a purchase place, a purchase price, a purchase frequency, an evaluation, a degree of satisfaction, an intention of next purchase and an impression.

The name of commercial article is a name of the questionnaire target commercial article. The commercial article code No. is a type number of the commercial article concerned.

The purchase time is specified in a predetermined for such as YYYY/MM/DD.

The purchase place is a character string for specifying a purchase place. This is, for instance, Tokyo shop of OO department store.

The purchase price is an amount of money for purchasing the commercial article concerned. The purchase frequency is indicated such that a normal frequency of purchasing the commercial article concerned is O year(s), O month(s) or OO day(s).

The evaluation is an evaluation in terms of a function and a performance of the commercial article concerned when compared with other commercial articles coming under the same commercial article category, and is entered in 10-level numerical values of 1 through 10.

The degree of satisfaction is a degree of self-satisfaction when the requester P, etc., uses the commercial article concerned, and is entered in 10-level numerical values of 1 through 10.

The intention of next purchase indicates whether the requester P, etc., intends to purchase the commercial article concerned next time or not, and is described by "intended" or "unintended".

The impression is an impression held by the requester P, etc., about the commercial article concerned, and is a text of which a maximum length is restricted to a predetermine value.

<Generation of Cluster>

FIG. 6 is an explanatory diagram showing clusters for categorizing the customers in terms of the consumption characteristics of the customers for every commercial article. A table in FIG. 6 is a modified form of the user cluster definition table 24, wherein the commercial article categories are arranged along the vertical axis. Further, factors contributing to purchasing the commercial articles are shown along the horizontal axis of this table in place of the clusters in the user cluster definition table 24.

The factors in the table in FIG. 6 are, however, arranged from left in sequence of the contribution rate of each commercial article from the highest to the lowest. For instance, in the case of purchasing the automobile, the factors showing the larger contribution rates are sequenced such as family members, a brand image and an annual income.

Then, the participant having characteristics showing three persons as the family members, the X-company evaluated as the car brand image and OOO yen as the annual income, is allocated to the cluster 1 of the automobile.

Further, in the "beer" category, the tastes, the brand image and a TV watching time are given in sequence of the contribution rate from the highest to the lowest. Then, for example, the participant who likes alcoholic drinks, has a good feeling about a brand of the S-beer and has 3 hours everyday as a TV watching time, is allocated to the cluster 4 in the "beer" category.

Thus, the cluster is determined based on the characteristics of the individual user in the factor exhibiting the high contribution rate to purchasing each commercial article. According to this embodiment, the participant is assigned two categories of clusters.

A first cluster is a cluster based on only the demographic data defined the basic characteristics. A second cluster is a cluster based on the detailed characteristic data containing the taste, the opinion and favorite brand. The detailed characteristics are arbitrarily inputted. It, however, follows that the user having inputted these characteristics is given a more accurate answer than in the case based on only the basic characteristics.

<Structure of Query Command>

Figure 7:
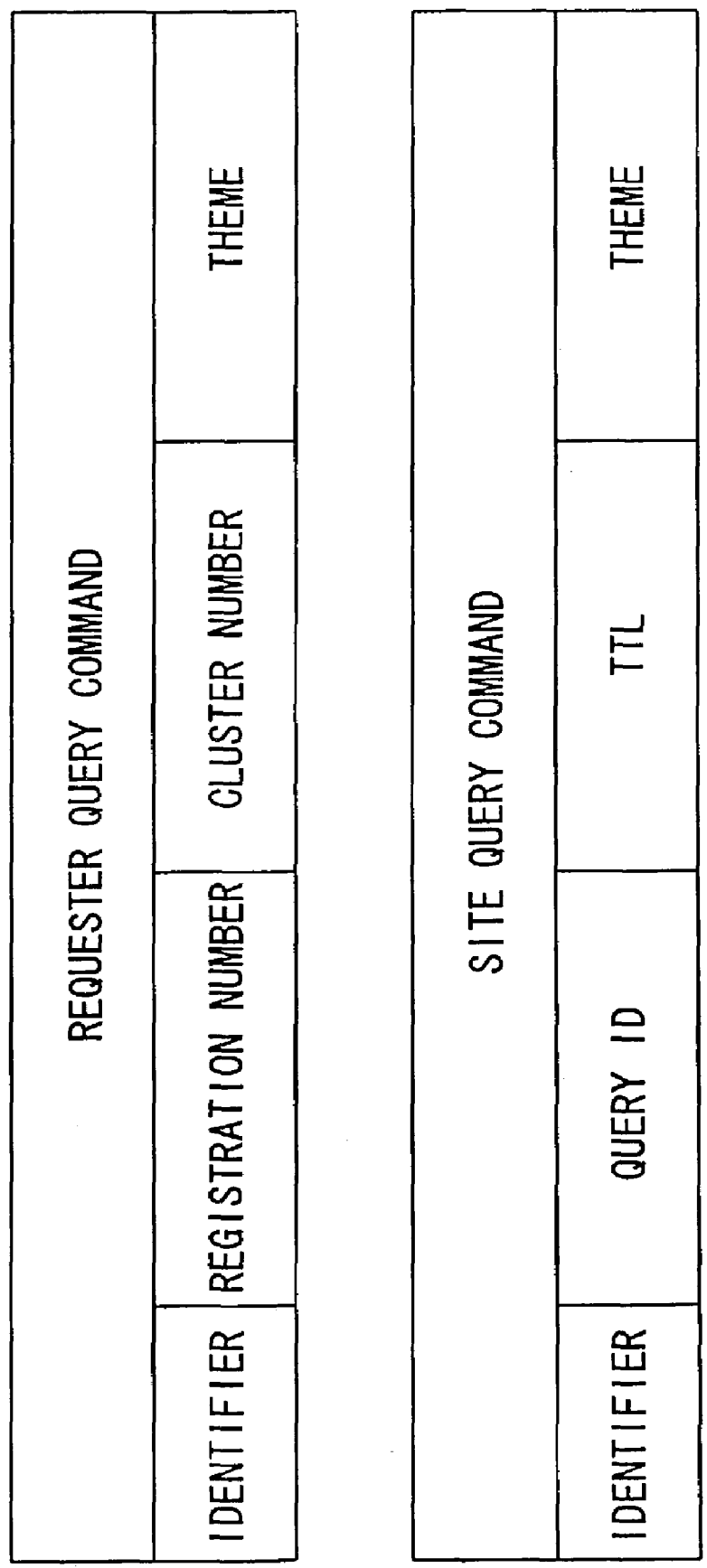
FIG. 7 is a diagram showing a query data structure used by the participant host 11a, etc., shown in FIG. 1.

FIG. 7 shows structures of the requester query command and of the side query command.

The requester query command consists of an identifier, a registration number, a cluster number and a theme. The identifier is information indicating that a command concerned is identical with the requester query command. The registration number is a number for identifying the requester P registered on the viral search site 10.

The cluster number is a cluster number in a theme of the requester P who queried the viral search site. For instance, if the theme is concerned about a certain commercial article, the cluster number is the number of the cluster to which the query originator user is allocated with respect to this commercial article.

Further, the theme is a content of the query and contains, e.g., a name of commercial article and a query item. The name of commercial article is, for instance, a brand of the commercial article. Further, the query item is, e.g., a purchase price, a degree of satisfaction or an intention of next purchase, etc.

The site query command is structured of an identifier, a query ID, a TTL and a theme. The identifier is information indicating that this command is identical with the site query command.

The query ID is a serial number that identifies the site query command distributed across the network. If the site query command having the same query ID is distributed or forwarded twice to the same participant host 11a, etc., the second site query command is discarded.

The TTL is a parameter for restricting a forwarding count of the site query command. The TTL is initialized on the viral search site 10 and is decremented each time the site query command is forwarded from the participant host 11a, etc., to the other participant host 11b, etc.

The theme is a theme inquired of the viral search site 10 through the requester query command. The theme is, for example, a question such as "What is a degree of satisfaction with the car X ?".

Figure 8:
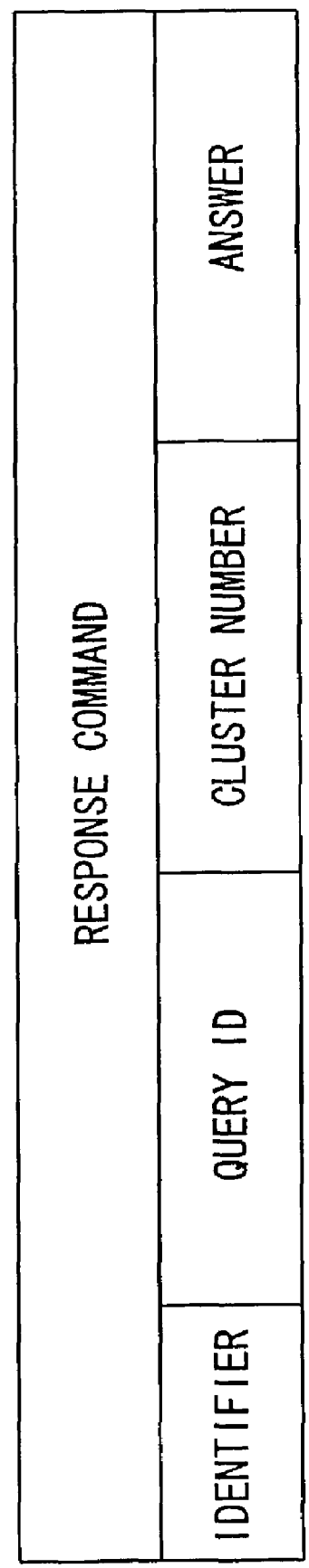
FIG. 8 is a diagram showing a data structure of an answer to the query.

FIG. 8 shows a structure of a response command to the site query. The response command is structured of an identifier, a query ID, a cluster number and an answer. This identifier is information showing that the command is identical with the response command.

Further, the query ID is identical with the query ID contained in the site query. The query ID is information for identifying which site query the response command is given to.

The cluster number is a cluster number assigned to the responder participant A, etc., with respect to the query target commercial article.

The answer is an answer to the theme, wherein this answer is, e.g., that "the degree of satisfaction with the car X is 8".

<Hardware Architecture>

Figure 9:
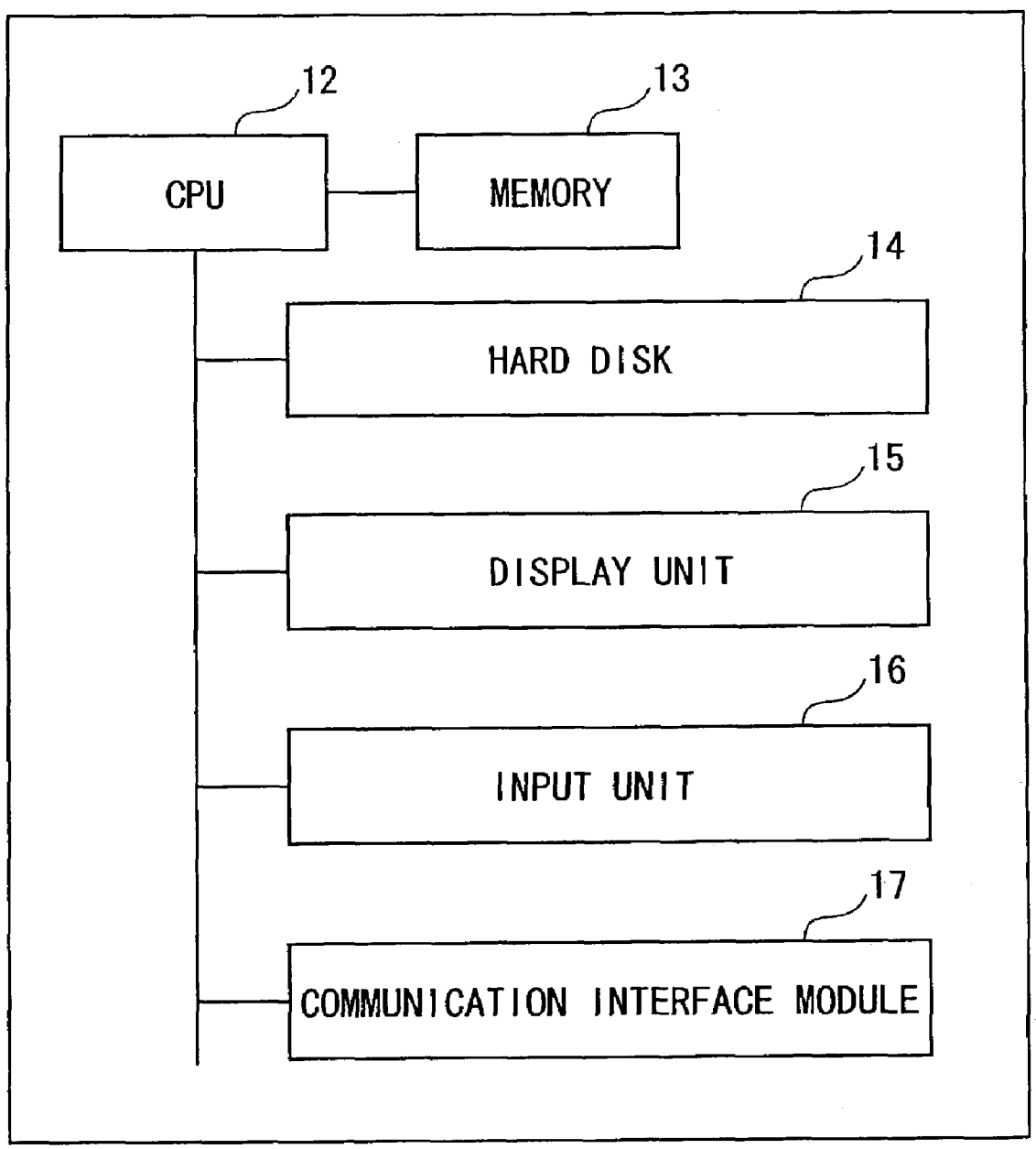
FIG. 9 is a diagram showing a hardware architecture of a requester host 11 shown in FIG. 1.

FIG. 9 is a diagram showing a hardware architecture of the requester host 11. Note that the other participant host 11*a*, etc., also has the architecture similar to the requester host 11. Each of these hosts is, to be specific, a personal computer, a PDA, a cellular phone, a digital TV, a set-top box connected to a TV monitor, and so on.

This requester host 11 includes a CPU 12 for executing an information processing program, a memory 13 for storing the information processing program executed by the CPU 12 and data processed by the CPU 12, a hard disk 14 for recording the information processing program and the data, a display device 15 for displaying a result of processing by the CPU 12 to the user, an input unit 16 used for the user to input the data, and a communication interface module 17 for accessing the network in accordance with a command given from the CPU 12.

The CPU 12 executes the information processing program stored on the memory 13, thereby providing a function as the requester host 11.

The memory 13 is stored with the information processing program executed by the CPU 12 and the data processed by the CPU 12.

The hard disk 14 records the information processing program executed by the CPU 12 and the data processed by the CPU 12.

The display device 15 displays the data inputted by the user and the result of processing the inputted data. The display device 15 is, for example, a CRT, a liquid crystal display, a film type liquid crystal display device, a PDP (Plasma Display Panel), an EL (electro-luminescence) panel, an FED (field emission display) and so on.

The input unit 16 is used for the user to input the information. The input unit 16 is, for instance, a keyboard, a press button dial, a mouse, a trackball, a joystick, an electrostatic touch panel, a stick-shaped acupoint, a touch panel or an optical pointing device, etc. Any two or more devices may be employed as the input unit 16.

The communication interface 17 accesses the network in accordance with the command of the CPU 12, and communicates with the other participant host 11*a*, etc., and with the administration host, etc., for providing the viral search site 10. The communication interface 17 is, for example, a modem card, LAN (Local Area Network), dialup router or Bluetooth standard interface, etc.

Note that the administration host for providing the viral search site 10 as a Web page has the architecture similar to the requester host 11 has, and hence the explanation thereof is omitted.

<Operation and Effects>

Figure 10:
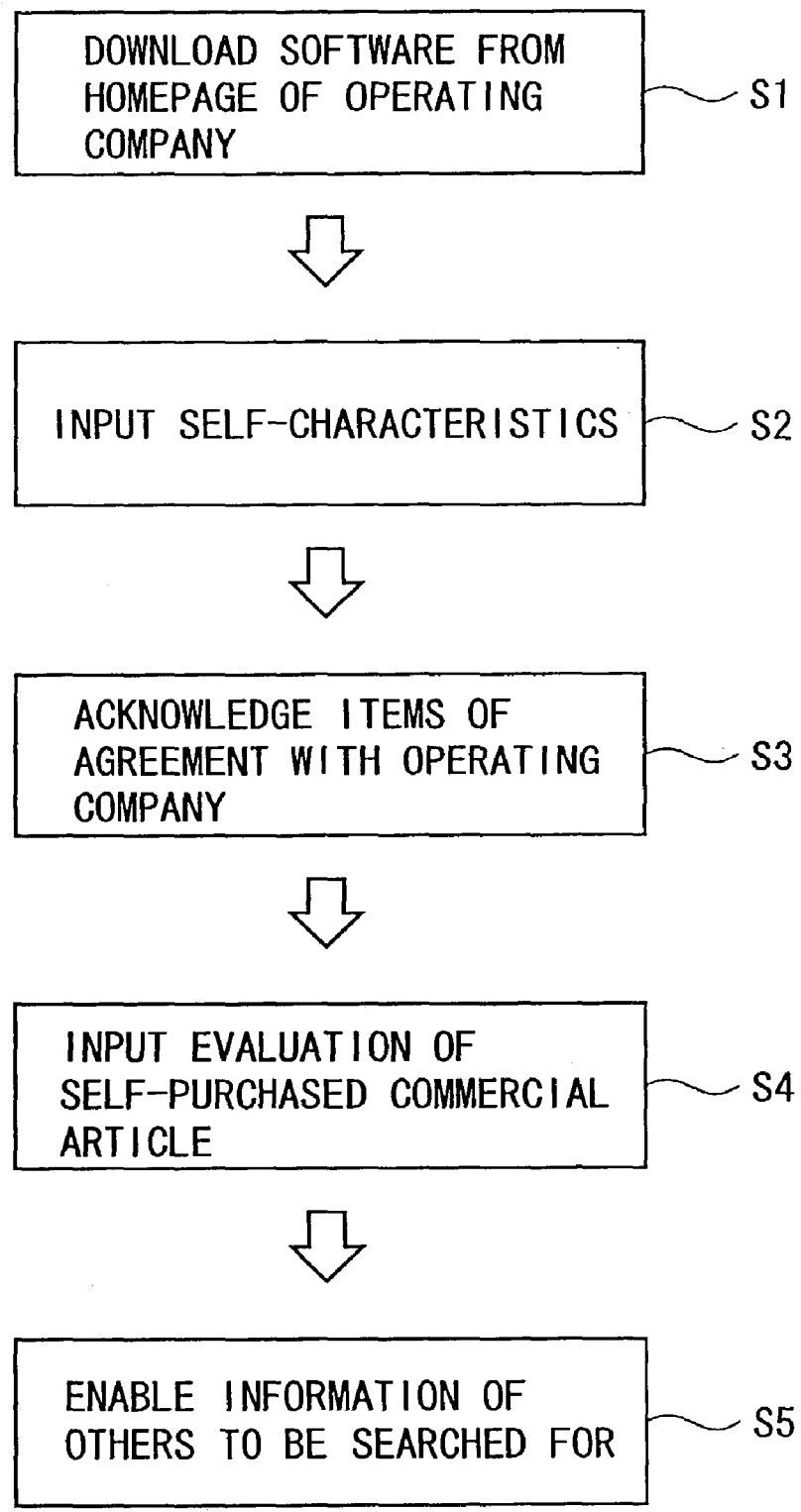
FIG. 10 is a flowchart showing member registration steps by the participant member in the viral search site 10 and a commercial article evaluation writing procedure.
Figure 11:
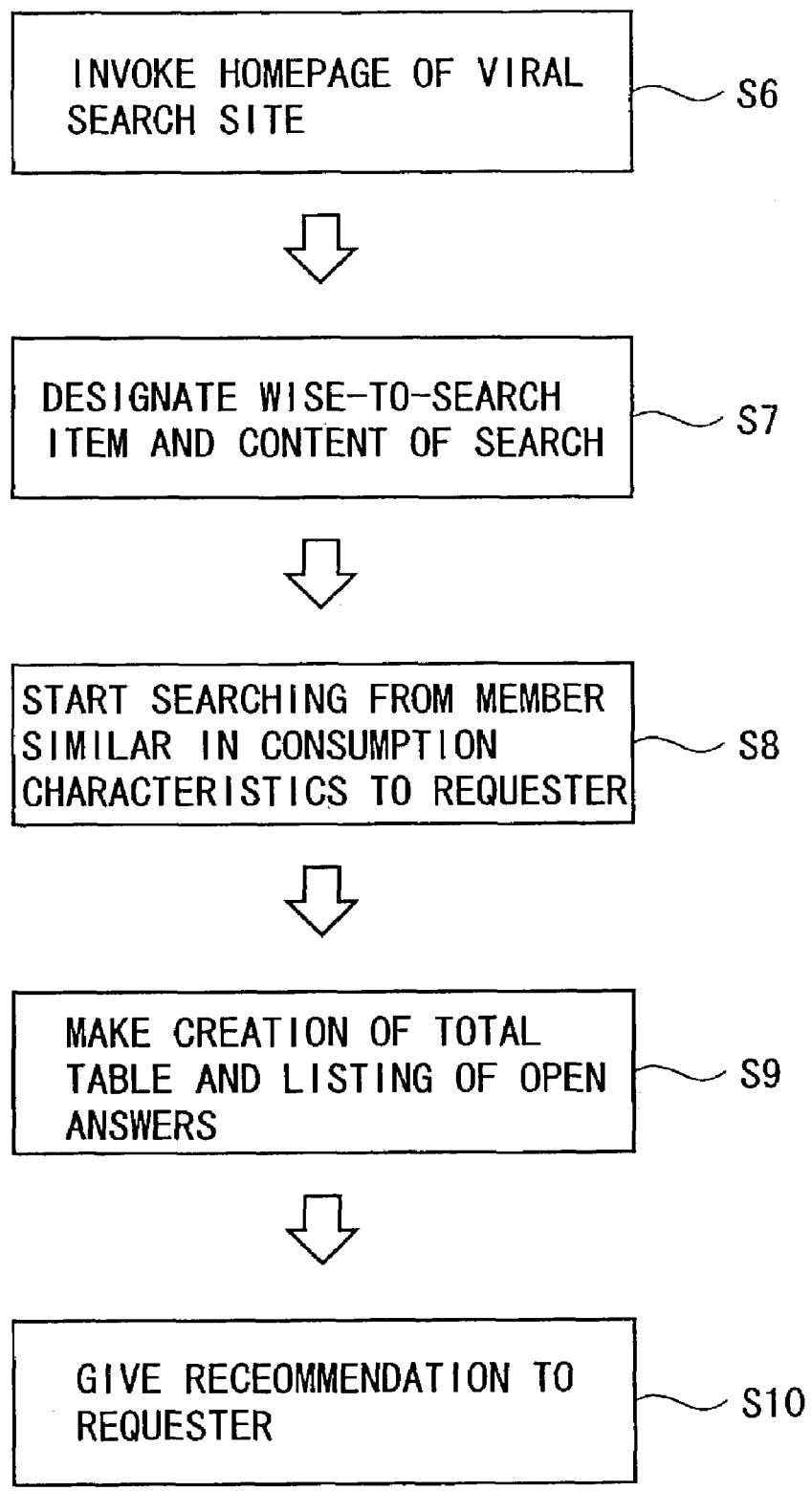
FIG. 11 is a flowchart showing operation steps when searching for other party information from the requester host 11 shown in FIG. 1.

FIGS. 10 and 11 show an operation flow in this information management system. FIG. 10 is a flowchart showing a step of registering a member in the viral search site 10 by the requester P and a commercial article evaluation write process.

The requester P, to begin with, downloads the information processing program from a homepage of a operating company, i.e., the viral search site 10 (S1). Next, the requester P executes this information processing program and does the following initial setting.

Subsequently, the requester P inputs the self-consumption-characteristic (S2). This consumption characteristic is categorized into the basic characteristics and the detailed characteristics. The basic characteristics are, e.g., the distinction of sex, the age, the family members, the address and the job. Further, the detailed characteristics are, e.g., the income, the brand image and the purchase behavior.

The requester may omit inputting the detailed characteristics. More detailed information based on the detailed characteristics is, however, acquired by inputting the detailed characteristics. The characteristics given above are saved on the hard disk 14 of the requester host 11, etc.

Next, the requester P inputs an acknowledgement of the commercial articles of the agreement with the operating company (S3). The commercial articles of the agreement prescribe that, for instance, the requester shall neither make any false answers nor sell any information of other companies, and so forth.

Next, the requester P inputs the self-purchased commercial article, such as the evaluation, the purchase place, the purchase price, the degree of satisfaction, the intention of next purchase, etc., at least five or more articles (S4).

Through inputting as described above, the requester is approved as a member of the viral search site 10. As a result, the recommendation information (recommendation) can be obtained by searching for the information of other members (S5). Note that the member of the viral search site 10 is able to input the evaluation of the commercial article purchased afresh by the member himself or herself.

FIG. 11 shows an operation flow when the requester makes a query, i.e., when searching for the information of other person. The requester at first invokes a homepage of the operating company, i.e., the viral search site 10 (S6).

Next, the requester designates a wish-to-search theme, e.g., the commercial article (item) and a content of the search (S7).

Then, the viral search site 10 compares the consumption characteristic of the requester P with the consumption characteristic of the member searched for. Subsequently, the viral search site 10 gathers results of the searching of the participant members having the similar consumption characteristics (S8).

The similarity of the consumption characteristic in this embodiment is judged based on the cluster number assigned to each participant A, etc., and the requester P, etc., for every commercial article. Namely, at first, the answers of the participant members coincident with the cluster number of the requester P are gathered.

When a sufficient answer count is not obtained from only the answers of those coincident with the cluster number, however, the filtering condition is slackened down to clusters adjacent to the cluster number of the requester P, thus collecting the answers. Further, free answers of the respective members, i.e., free text-formatted impressions, etc., are totaled in a series-of-list format.

Next, the viral search site 10 creates a total table from the results of the collections described above (S9). Subsequently, the viral search site 10 creates, based on the total table, the recommendation information (recommendation) (S10). The recommendation information contains a list of the free answers.

Figure 12:
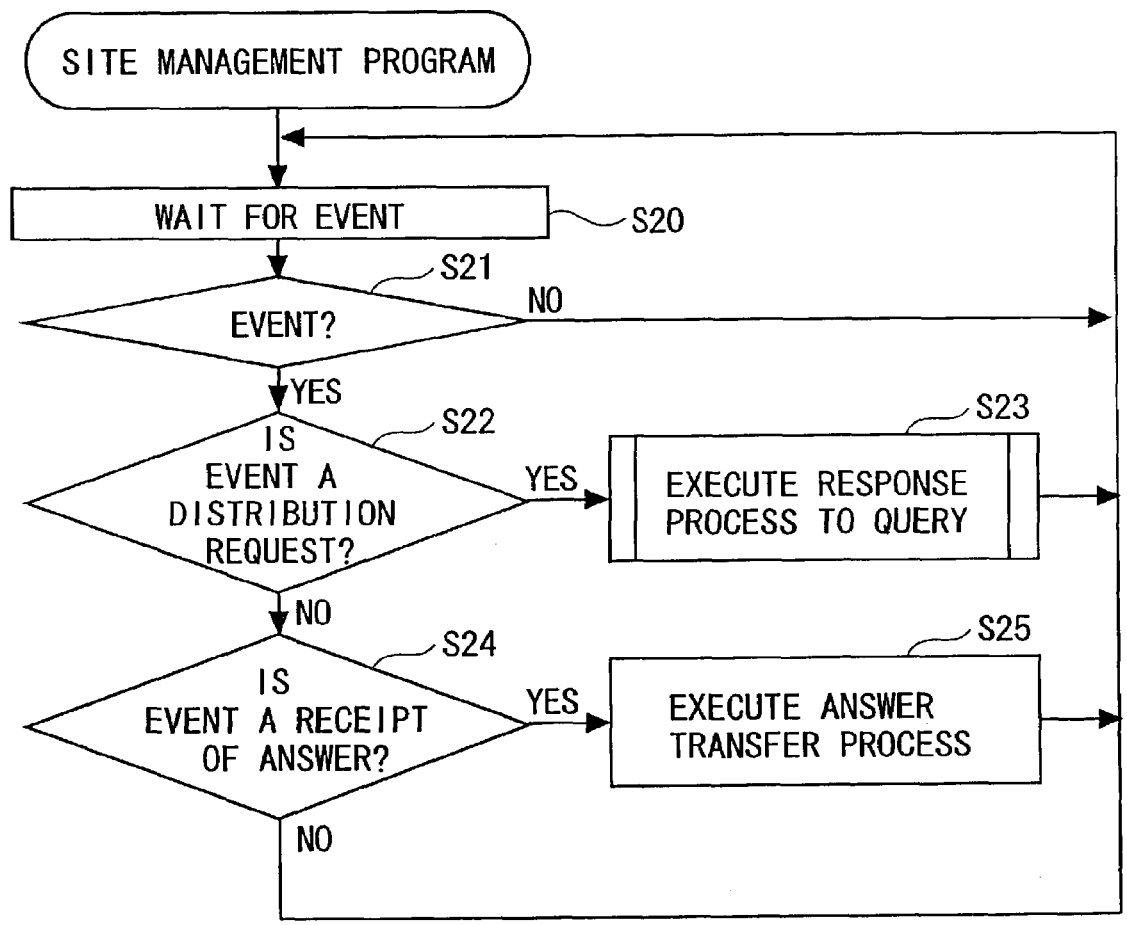
FIG. 12 is a flowchart showing processing steps of an information processing program executed by the requester host 11 and the participant host 11a, etc.

FIG. 12 is a flowchart showing processing steps of the information processing program executed on the requester host 11 and on the participant host 11*a*, etc. The CPU 12 executes this information processing program, thereby providing a function as the participant host 11a, etc., of the viral search site 10.

The CPU 12, after executing this information processing program, comes to a wait-for-event status (S20, S21). An event is a factor that changes the control status of the CPU 12.

When the event occurs (YES in S21), the CPU 12 judges whether the event is a receipt of the query or not (S22). If the event is the receipt of the query, the CPU 12 executes a response process to the query (S23). Thereafter, the CPU 12 returns the control to S20.

On the other hand, if the event is not the receipt of the query, the CPU 12 judges whether or not the event is a receipt of the answer (S24). If the event is the receipt of the answer, the CPU 12 transfers this answer to the query forwarding source (S25). Thereafter, the CPU 12 returns the control to S20.

On the other hand, if the event is not the receipt of the query, the CPU 12 executes nothing and returns the control to S20.

Figure 13:
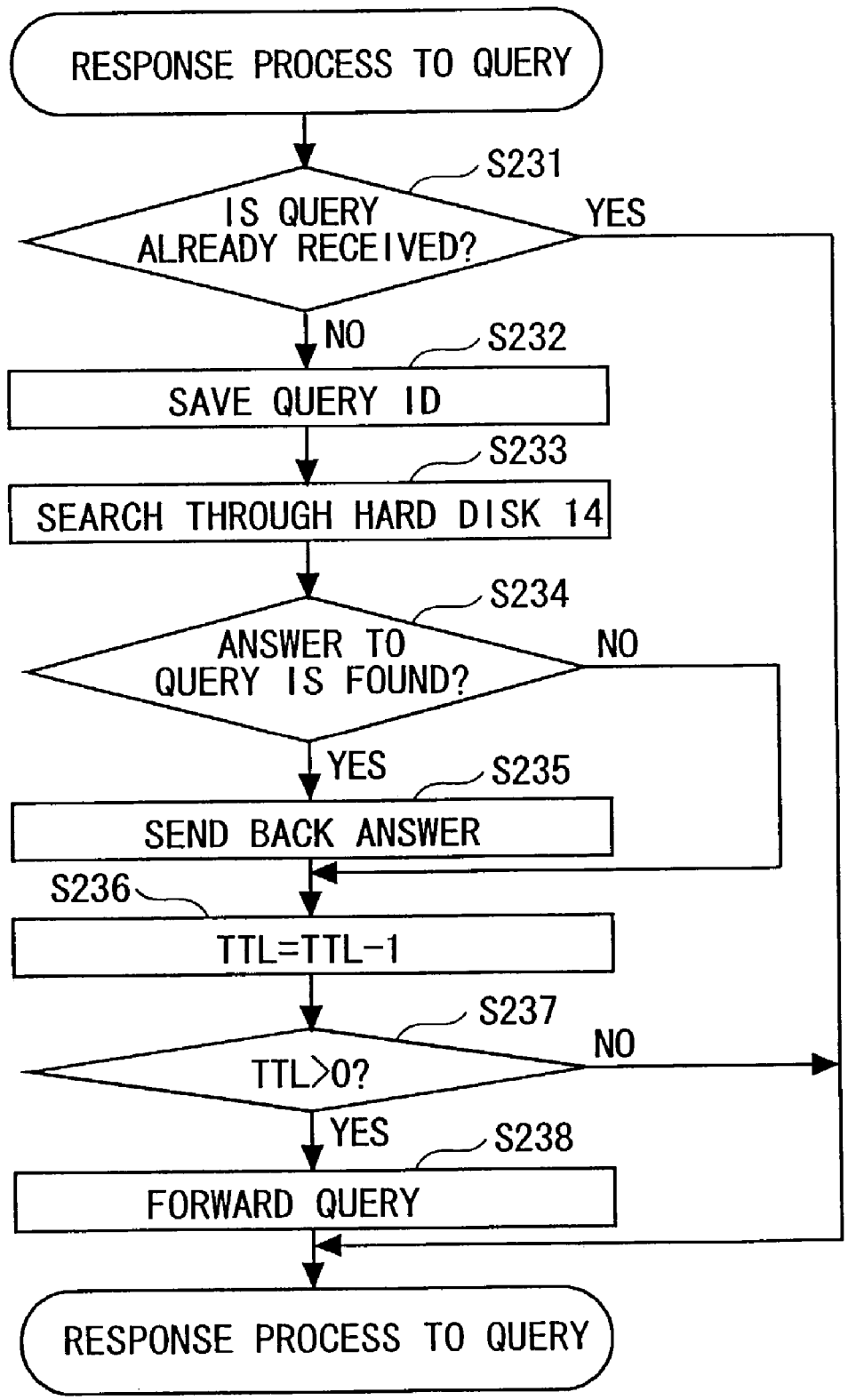
FIG. 13 shows details of a response process (S23 in FIG. 12) to the query.

FIG. 13 shows details of the response process to the query. In this process, the CPU 12 at first judges whether or not the query concerned has already been received. Whether already received or not is judged by checking whether the query ID described in the query header has already been received or not. The received query ID is saved on an unillustrated ring buffer. If the query ID has been already received (YES in S231), the CPU 12 discards the query concerned and finishes the response process to this query.

Whereas if not received (NO in S231), the CPU 12 saves the query ID of this query on the unillustrated ring buffer (S232).

Next, the CPU 12 searches for an answer corresponding to the query through on the hard disk 14 (S233).

Then, the answer to the query is found out on the hard disk 14 (YES in S234), this answer is sent back to the query forwarding source (S235).

Next, the CPU 12 decrements the TTL by 1 (S236). Then, the CPU 12 judges whether the TTL is larger than 0 or not (S237).

If the TTL is larger than 0, the CPU 12 further forwards the query to the participant host 11b, etc., connected to the host itself (S238). Thereafter, the CPU 12 finishes the response process to the query.

By contrast, if the TTL is equal to or smaller than 0, the CPU 12 directly finishes the response process to the query.

Figure 14:
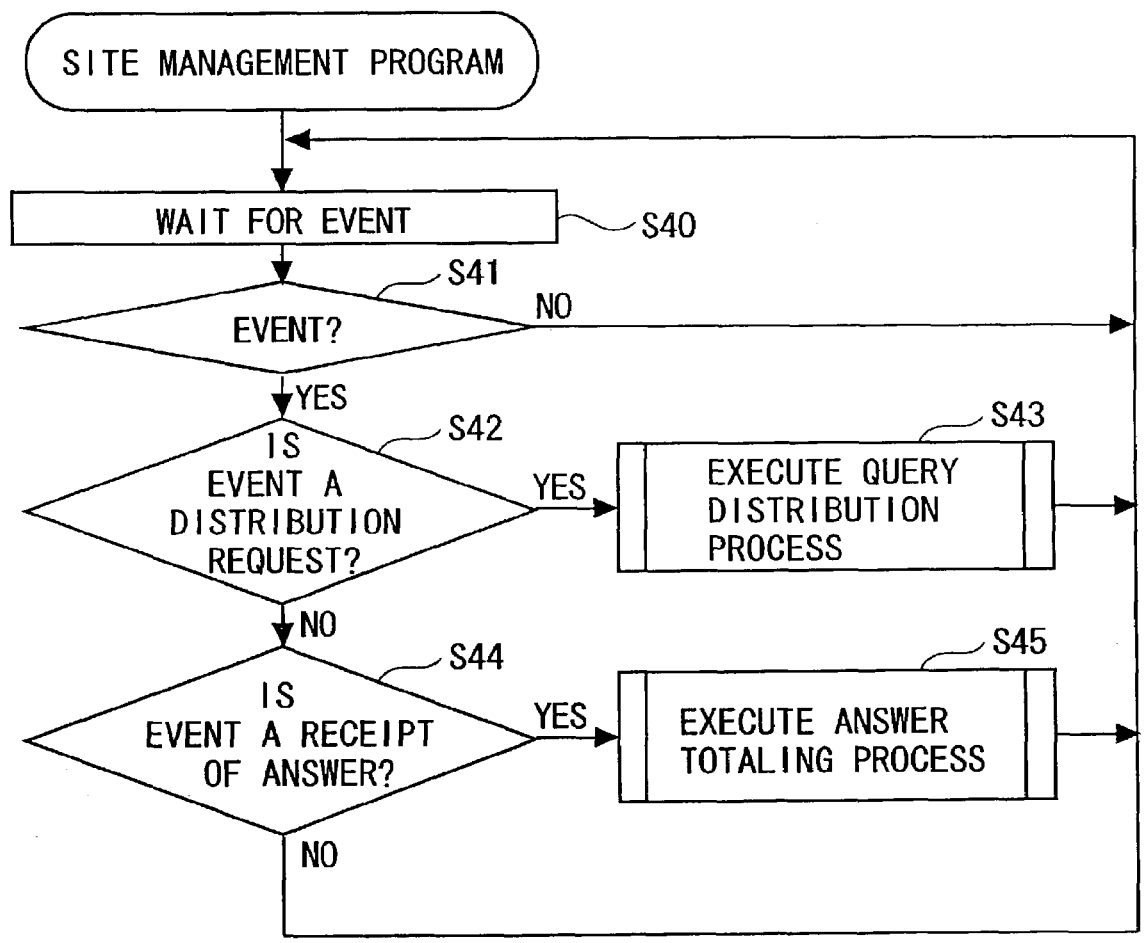
FIG. 14 is a flowchart showing processes of a site management program of the viral search site 10.
Figure 15:
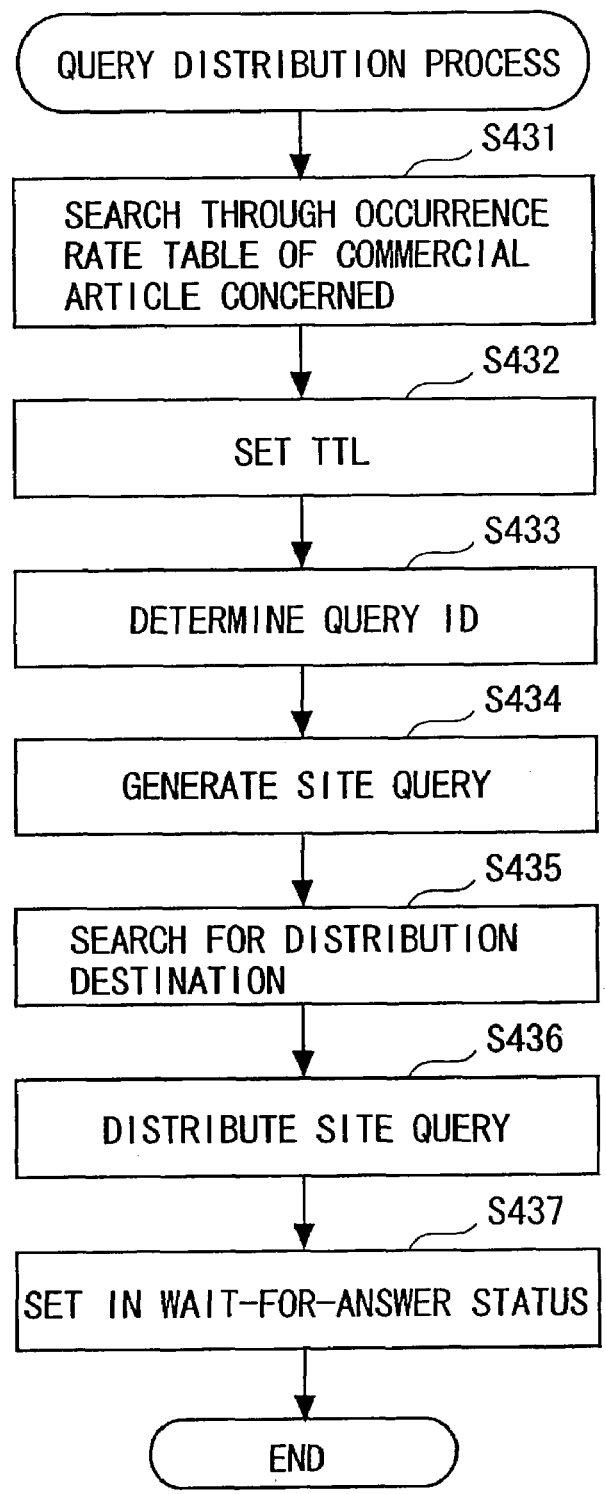
FIG. 15 shows details of a distribution process (S43 in FIG. 14) of the query.
Figure 16:
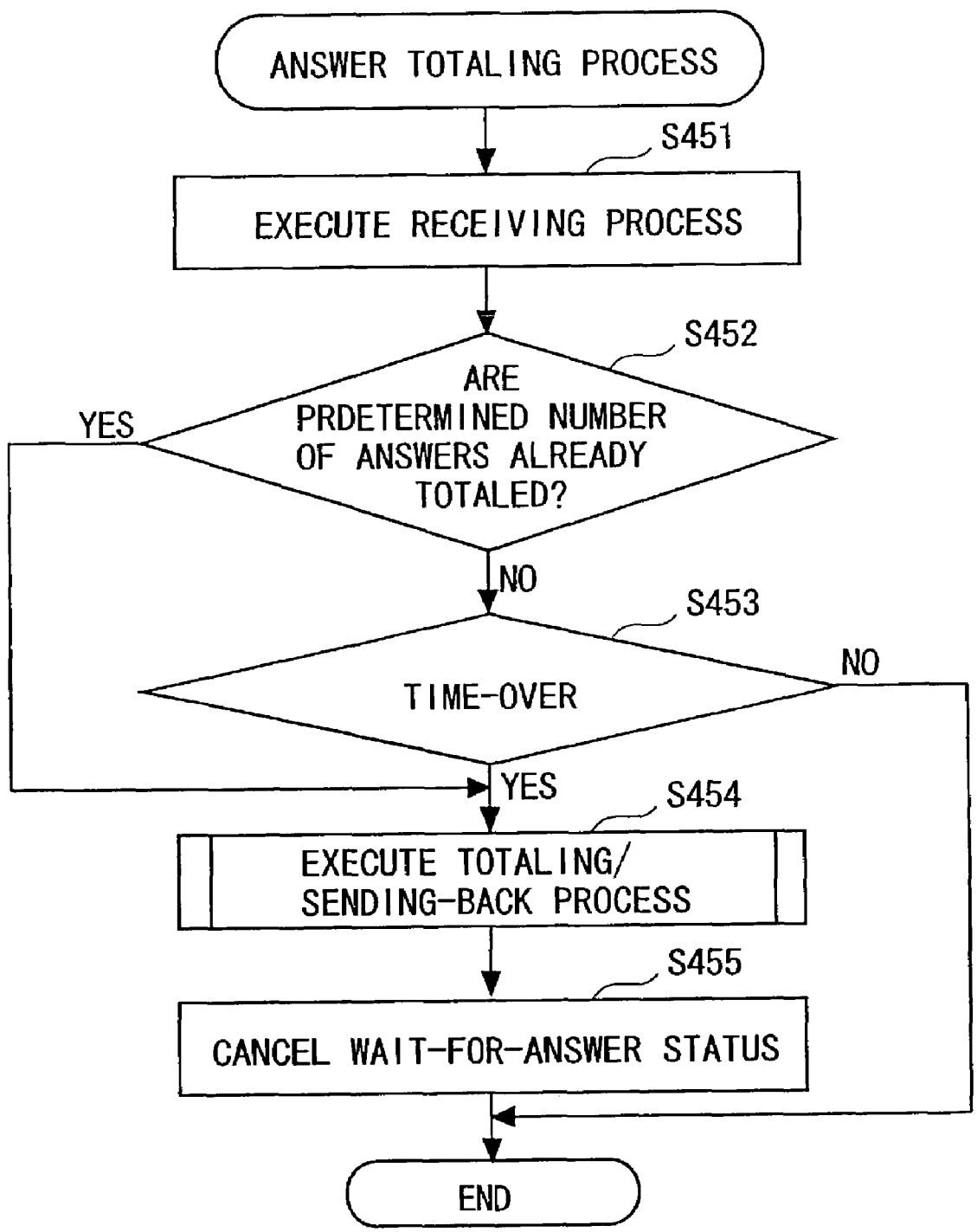
FIG. 16 shows details of an answer collecting process (S45 in FIG. 14)

FIGS. 14 through 16 show processes of a site management program of the viral search site 10. The administration host for providing the viral search site 10 executes the site management program, thereby providing functions of the viral search site.

During the execution of the site management program, the administration host is normally in the wait-for-event status (S40, S41). When an event occurs, the administration host judges whether or not the event is a distribution request (S42). If the event is the distribution request, the administration host executes a query distribution process (S43). Thereafter, the administration host returns the control to S40.

Whereas if the event is not the distribution request, the administration host judges whether or not the event is a receipt of the answer (S44). If the event is the receipt of the answer, the administration host executes an answer totaling process (S45). Thereafter, the administration host returns the control to S40. Whereas if the event is not the receipt of the answer, the administration host executes nothing and returns the control to S40.

FIG. 15 shows details of the query distribution process. In this process, the administration host, to begin with, searches through an occurrence rate table of the query target commercial article (S431).

Next, the administration host sets the TTL based on an occurrence rate of the commercial article concerned (S432). For example, the TTL is determined by (Formula 1) which follows.

$$TTL = \log 2(\text{Predetermined Total Sample Count} \times \text{Occurrence Rate}) \times \text{Coefficient} \quad \text{(Formula 1)}$$

Herein, the predetermined total sample count is the number of answers to the query which are to be collected, and is a target value for obtaining statistically significant samples.

Further, the occurrence rate is a spread rate at which the commercial article concerned spreads among the users. As shown in FIG. 2, for instance, the automobile is recorded in the occurrence rate table such that the occurrence rate is 5 nodes, this indicates one automobile for every five users.

Moreover, the coefficient is a safety rate for surely obtaining the answers of the predetermined total sample count, and values of, e.g., 1 through 100 are used.

Next, the administration host determines the query ID (S433). The query ID is a serial number for identifying the query.

Subsequently, the administration host generates the site query command in the format in FIG. 7 (S434).

Next, the administration host searches for a destination address of the distribution (S435). The participant host 11a as the distribution is the participant host having a communication result in the past. If each of the participant hosts 11a, etc., is connected to the network for the first time and has no communication result, however, the distribution destination is determined beforehand by a host search.

The host search is a process of searching for a host answerable to the query. The host search is a special query for recruiting the participant hosts. The forwarding and answering steps in the host search are the same as in the case of the site query.

Next, the administration host distributes the site query command (S436).

Subsequently, the administration host sets a wait-for-answer status (S437). In this process, the query ID is registered in an unillustrated wait-for-answer table. Thereafter, the administration host finishes processing.

FIG. 16 shows an answer totaling process. In this process, at first the administration host executes a receiving process (S451). In this process, the administration host stores the memory with the answers received in an unillustrated mail box.

Next, the administration host judges whether or not a predetermined number of answers are totaled (S452). If the predetermined number of answers are not totaled, the administration host further judges whether it is a time-over nor not (S453). This schemes to discontinue the answer totaling process at a predetermined time.

If not the time-over, the administration host terminates the answer totaling process. As a result, the wait-for-answer to the query continues. If it is the time-over, the administration host advances the control to S454.

When judging in S452 that the predetermined number of answers are totaled, or when judging in S453 that it is the time-over, the administration host executes a totaling/sending-back process (S454). This process is a process of totaling the answers saved on the memory and sending it back to the requester host 11.

Next, the administration host cancels the wait-for-answer status (S455). Namely, the administration host deletes the query ID concerned from the unillustrated wait-for-answer table.

Figure 17:
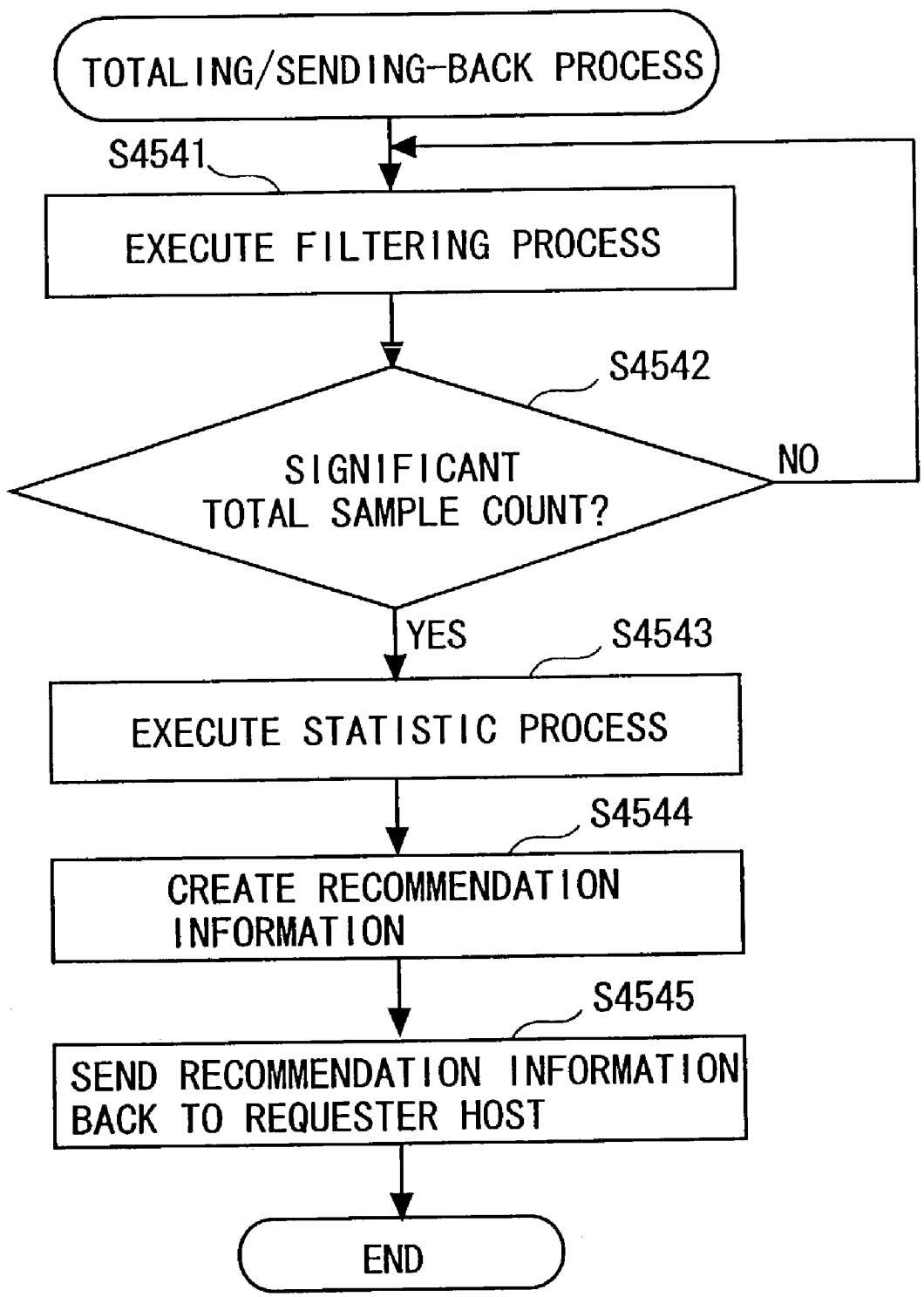
FIG. 17 shows details of a totaling/sending-back process (S454 in FIG. 16)

FIG. 17 shows details of the totaling/sending-back process. In this process, the administration host at first executes a filtering process (S4541). In this process, there are totaled the answers having the cluster number coincident with the cluster number of the requester P with respect to the commercial article related to the query among the answers saved in the process in S451 in FIG. 16. Further, the free answers contained in the answers are accumulated in the series-of-list format.

Next, the administration host judges whether the answers of the total sample count as a significant count are collected or not (S4542). The significant count is the predetermined value prescribed on the viral search site 10.

If there is not the significant total sample count, the administration host slackens the filtering condition and executes a re-filtering process (S4540). In the first filtering process, only the answers having the cluster number coincident with the cluster number of the requester P are collected with respect to the query target commercial article.

In the re-filtering process, the answers having the cluster numbers adjacent to the cluster number of the requester P are collected. Thus, the process in S4541 is repeated till the answers of the significant sample count are gathered in a way that slackens the filtering condition.

Next, the administration host executes a statistic process (S4543). Herein, for instance, a degree-of-satisfaction distribution of the commercial article, and maximum, minimum, average and standard deviations are calculated from the answers.

Subsequently, the administration host creates the recommendation information (S4544). As for this answer, there are shown a degree-of-satisfaction distribution of, for example, the commercial article X and a list of free answers. Next, the administration host sends the recommendation information back to the requester host 11 (S4545).

As discussed above, according to the information processing system in this embodiment, in response to the search request of the requester P, the evaluation results of the commercial articles purchased by the participant members A, etc., in the viral search site 10 are gathered, and the recommendation information can be generated from the so-called word-of-mouth information.

Further, the viral search site 10. With respect to the query target commercial article, collects the answers having the cluster number(s) that is the same as or adjacent to the cluster number of the requester P. This cluster number is the number for categorizing the members exhibiting the similar factor having the high contribution rate to the purchase of the commercial article, and the recommendation information adequate to the requester P is generated.

Moreover, the results of the evaluations by the participant members may be stored on the participant host 11*a*, etc., at a proper timing after the members have evaluated the commercial article. Then, when the query is given from the requester, the necessary items of information are collected from the participant hosts 11*a*, etc., having the evaluation results as the answers in response to this query.

Accordingly, each of the participant members 11*a*, etc., has no necessity of answering particularly by synchronizing with the search request from the requester P. Namely, each member may accumulates the information on the commercial articles purchased day by day by the member himself or herself. Thus, it follows that the information accumulated in distribution is provided to a necessary requester P at a necessary time.

<Modification of Step of Collecting Answers to Search Request>

According to the embodiment discussed above, when the answer to the search request is hit, this answer is sent back to the forwarding source. Namely, the answer is sent back tracing the sequence reversed to the forwarding sequence. The embodiment of the present invention is not, however, limited to the answering steps given above. For example, the answer may be sent back directly to the viral search site 10 from the participant host 11*c*, etc., with the answer hit. FIGS. 18 through 23 show system architectures of such a system, a data structure or processes.

[Example of Sending Answer Back Directly to Viral Search Site 10 from Answerer]

Figure 18:
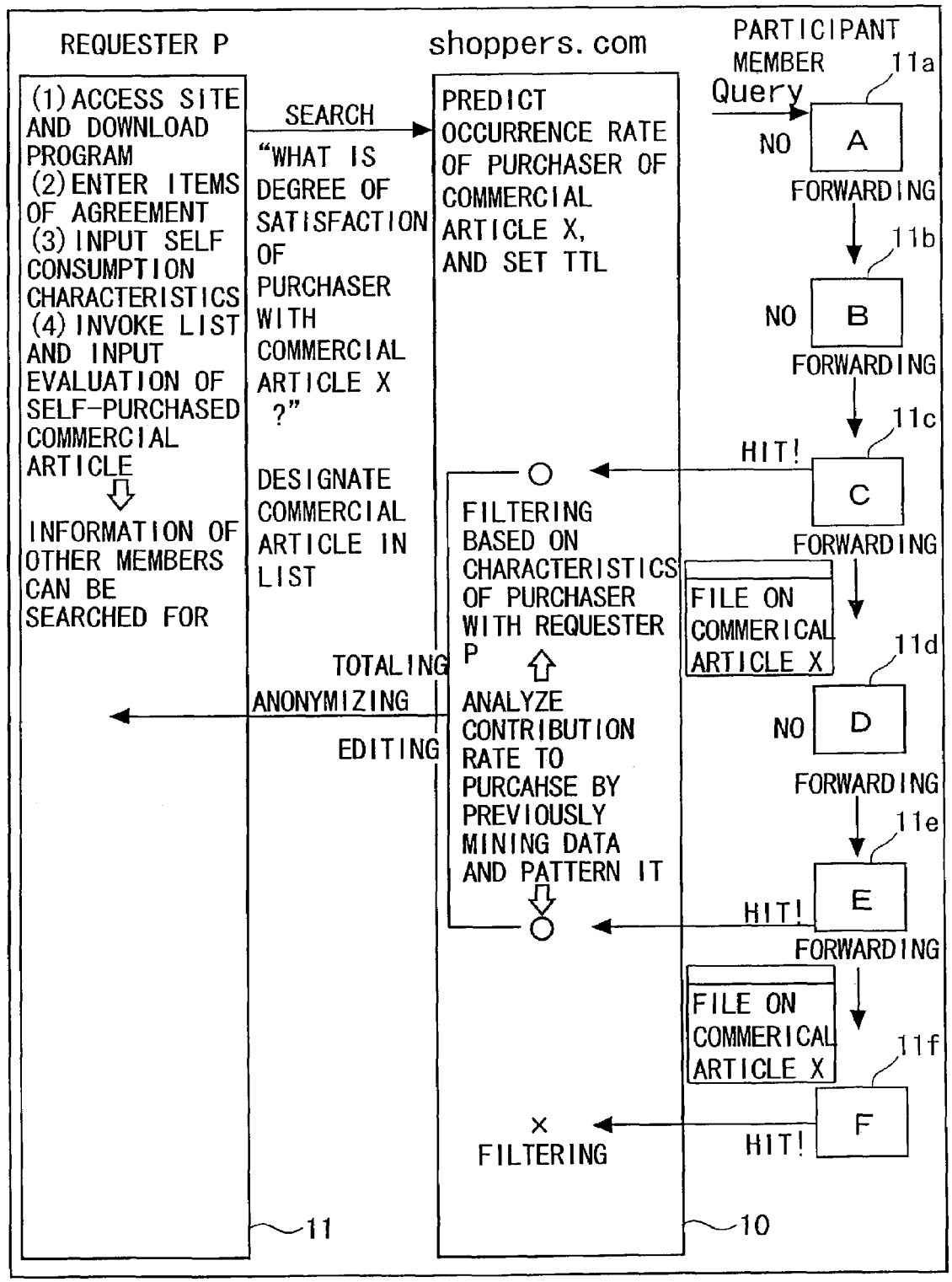
FIG. 18 is a diagram showing a system architecture of an information management system in a first modified example of a first embodiment.

FIG. 18 shows the system architecture of sending the answer back directly to the viral search site 10 from the answerer. Referring to FIG. 18, the answer to the search request is hit on the participant hosts 11*c*, 11*e* and 11*f*. Then, this answer is given directly to the viral search site 10 from these participant hosts 11*c*, 11*e*, 11*f*.

For attaining this, the respective participant hosts 11*c*, etc., may retain an on-the-network address of the viral search site 10. Other configurations and operations in FIG. 18 are the same as those in FIG. 1, and hence their explanations are omitted.

[Example of Filtering and Totaling by Requester Host 11]

In the embodiment discussed above, the viral search site 10 gathers the answers to the search request, then executes the predetermined filtering thereof and totals the answers, thereby creating the recommendation information. The embodiment of the present invention is not, however, confined to this scheme. For example, the requester host 11 may execute a part of the processes after totaling the answers.

Figure 19:
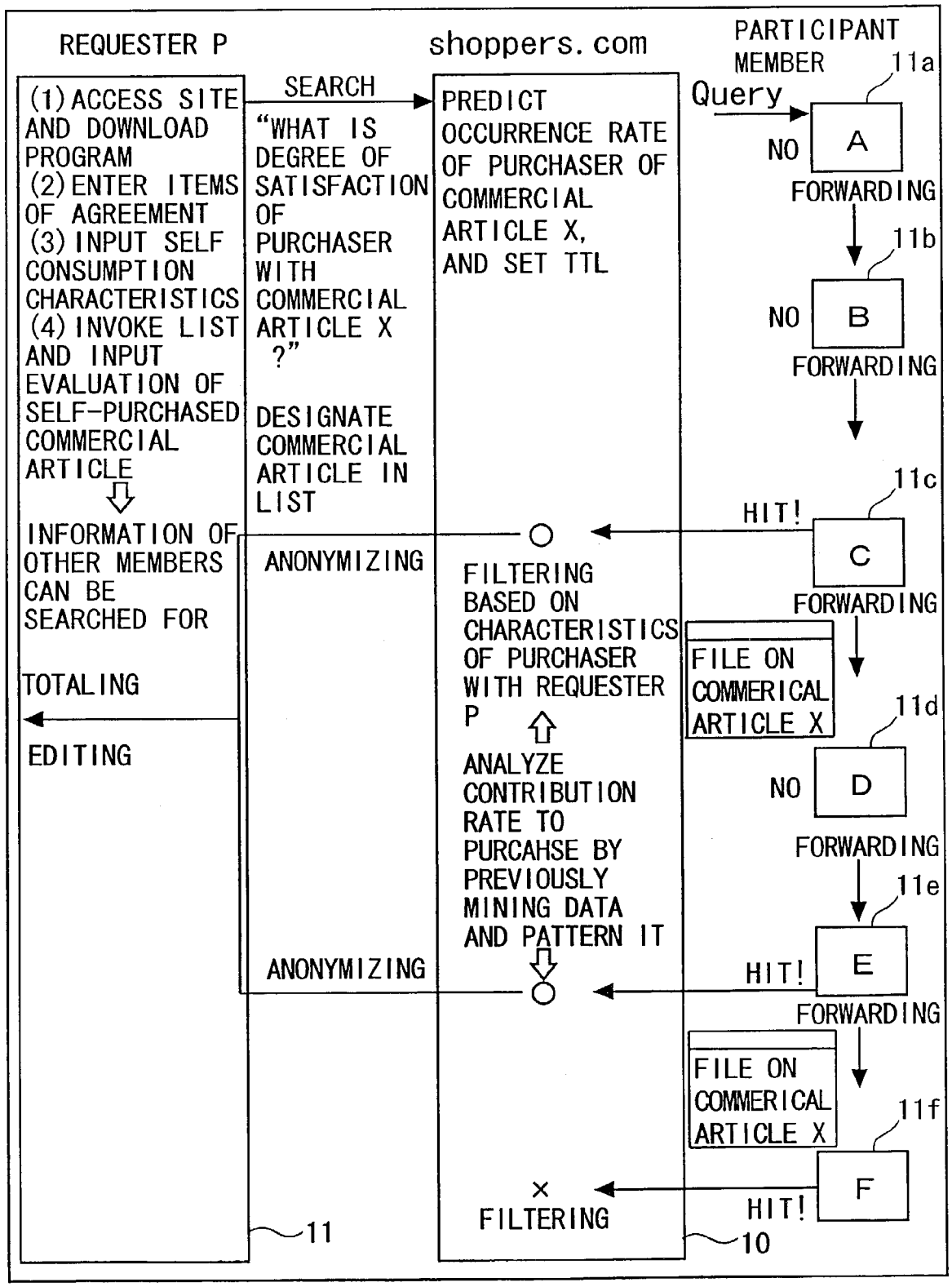
FIG. 19 is a diagram showing a system architecture of an information management system in a second modified example of the first embodiment.

FIG. 19 shows an example of the system architecture of such an information management system. In the system also in FIG. 19, the answer to the query is similarly sent back directly to the viral search site 10 as by the system in FIG. 18.

According to the system in FIG. 19, however, the viral search site 10 gathers the answers and executes filtering based on the similarity of the factor exhibiting the high contribution rate to the purchase of the commercial article. Then, the viral search site 10 anonymizes the information having undergone filtering and transfers it to the requester host 11. The requester host 11 may total and edit the transferred answers, thereby creating the recommendation information.

Figure 20:
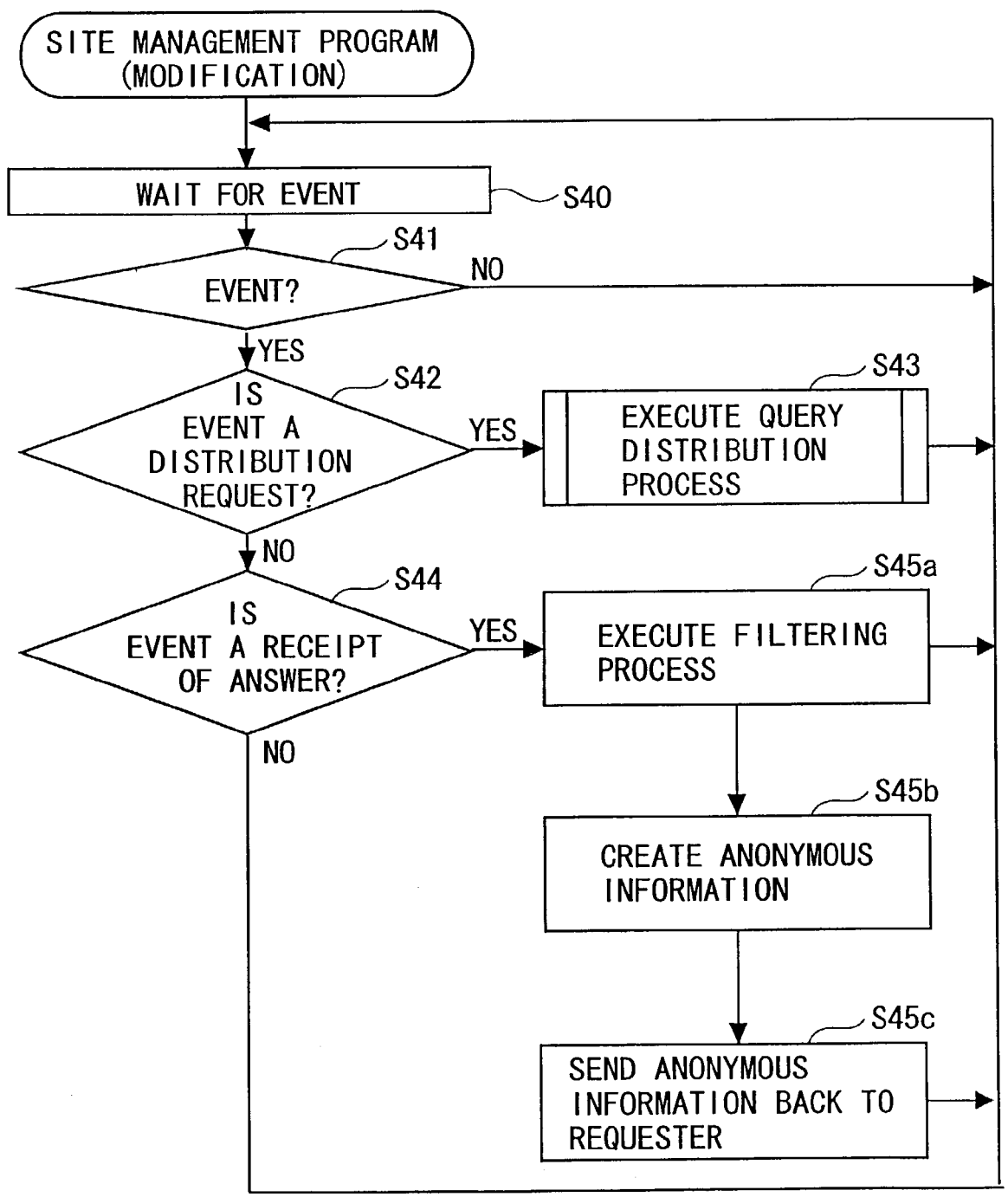
FIG. 20 is a flowchart showing processes of the site management program in the system in FIG. 19.

FIG. 20 shows processes of the site management program in the system in FIG. 19. In FIG. 20, the processes from S40 to S44 are the same as those in FIG. 14. Then, these processes are marked with the same symbols as those in FIG. 14, and their explanations are omitted.

The administration host, upon receiving the answer (YES in S44), executes the filtering process (S45*a*). This process is a process of totaling the answers having the cluster number(s) coincident with or adjacent to the cluster number of the requester P with respect to the query target commercial article.

Next, the administration host deletes from the answer the information that specifies an individual, such as an on-the-network address, etc., and creates anonymous information (S45*b*).

Next, the administration host sends the anonymous information back to the requester host 11 (S45*c*). The requester host 11 executes the totaling process of the answers, and so on.

[Example of Sending Answer Back Directly to Requester Host 11 from Answerer]

Figure 21:
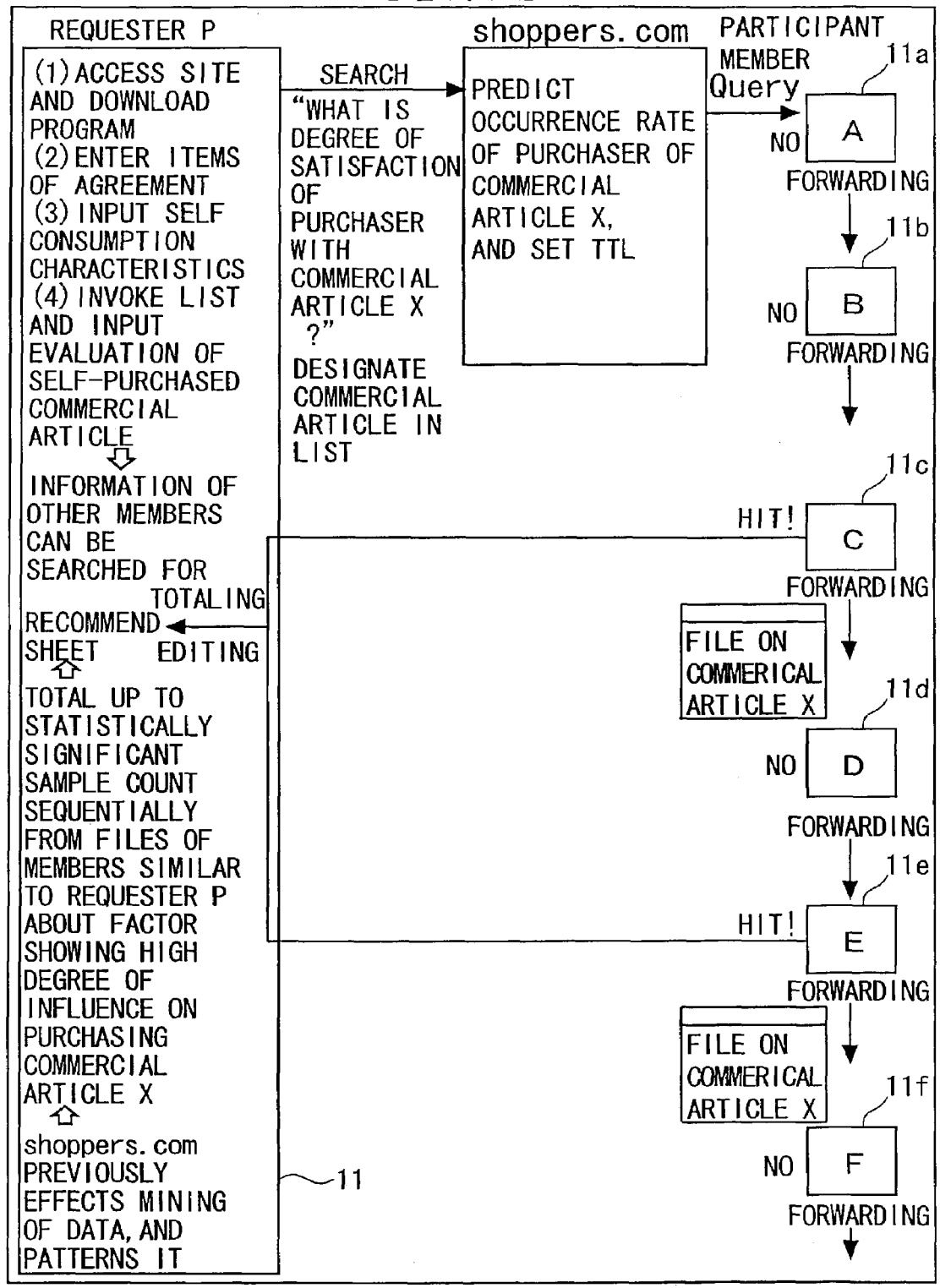
FIG. 21 is a diagram showing a system architecture of the information management system in a third modified example of the first embodiment.

FIG. 21 shows an architecture of the system in which the answer is sent back directly to the requester host 11 from the participant host 11c, etc., without through the viral search site 10. In FIG. 21, as in the case of the systems shown in FIGS. 1, 18 and 19, the query is forwarded sequentially from the viral search site 10 to the participant hosts 11a, etc. Referring to FIG. 21, however, the participant hosts 11c, e, etc., with the hit answer to the query send the answers back directly to the requester host 11.

Then, the requester host 11 collects the answers, executes the predetermined filtering, totals the answers after the filtering and creates the recommendation information.

Thus, the on-the-network address of the requester host 11 may be explicitly contained in site query command to be forwarded in order for the participant host 11c, etc., to transfer the answer directly to the requester host 11.

Further, the requester host 11 has the user cluster definition table 24 recorded with the cluster number of the requester P with respect to each commercial article. The requester terminal P selects the answer having the cluster number coincident with the cluster number of the requester P, and thus may execute filtering.

Note that the requester host 111 may, as shown in FIG. 19 or 21, collect the answers, then execute filtering or totaling and thus create the recommendation information also in the system in which the answer is sent to the forwarding source as shown in FIG. 1. In this case, the viral search site 10 may transfer the answers directly to the requester host 11 without filtering the answers.

[Modification of Filtering Process]

According to the embodiment discussed above, the answers are filtered on the word-of-mouth search site 10. In FIG. 21 showing the modified example given above, the requester host 11 executes filtering of the answers. The embodiment of the present invention is not, however, limited these steps. For example, each of the participant host 11a may execute filtering.

FIG. 22 shows a structure of the site query command at this time. This site query command has an addition of the cluster number as compared with the site query command shown in FIG. 7. This cluster number is a number indicating the cluster of the requester P with respect to the query target commercial article.

Figure 23:
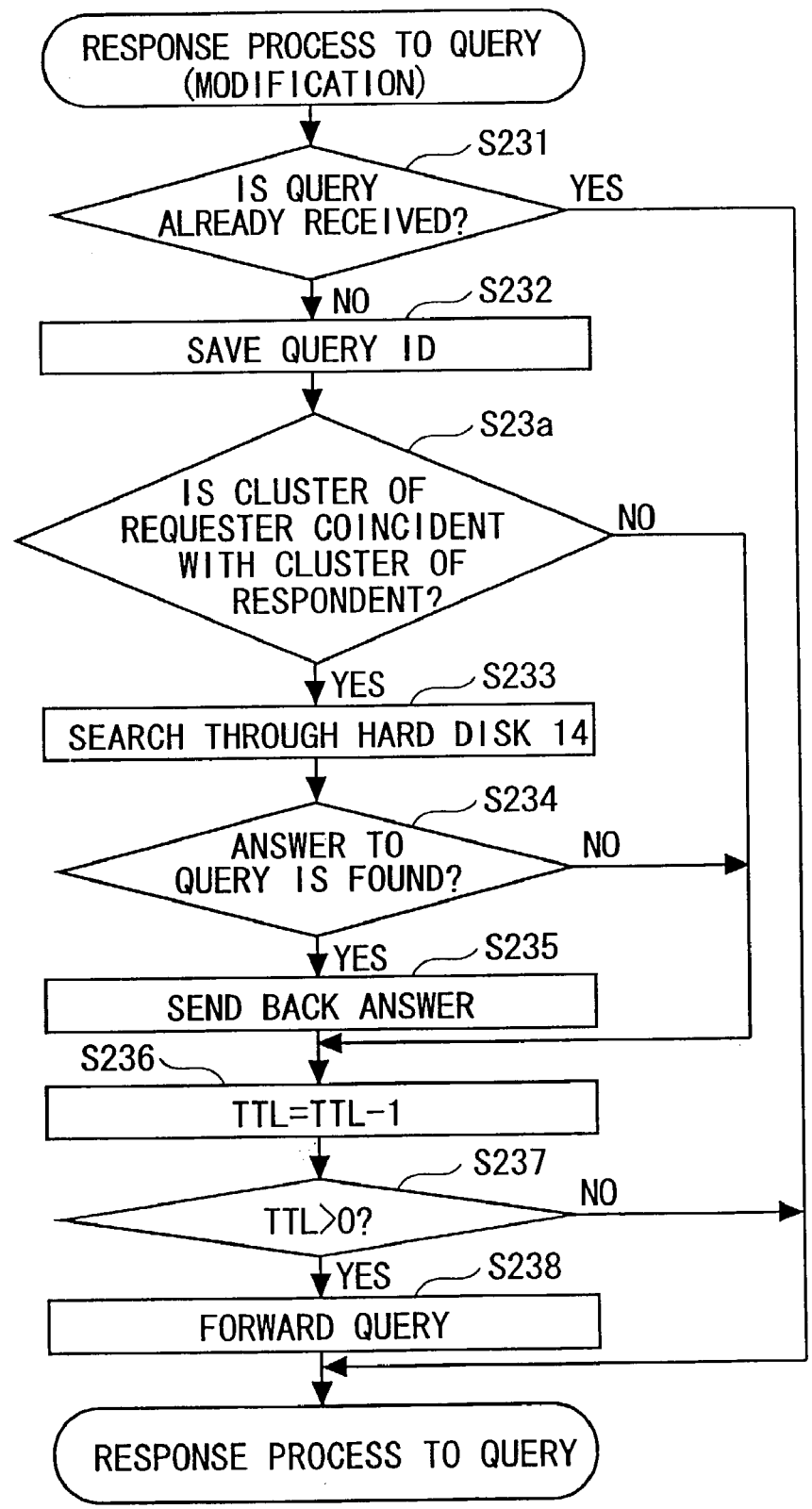
FIG. 23 is a flowchart showing a response process in the fourth modified example of the first embodiment.

FIG. 23 shows a response process in each of the participant hosts 11a, etc., when the thus structured site query command is distributed. This process is different from the case in FIG. 13 in terms of such a point that a judgement in S23a is added after the query ID saving process (S232).

In this process, in each of the participant hosts 11a, etc., the CPU 12 judges whether or not the cluster number of the requester P is coincident with the cluster number of the user (who is the answerer participant A, etc.) of the participant host 11a concerned (s23a).

If these cluster numbers are coincident with each other, the CPU 12 advances the control to S23 and searches through the hard disk 14.

Whereas if these answer patterns are not coincident, the CPU 12 does not search through the self hard disk 14 and advances the control to S236. Other processes are the same as those in FIG. 13 and therefore given the same symbols, and their explanations are omitted.

Thus, the participant host 11a performs filtering, thereby making it possible to reduce the answers sent back and to restrain a traffic.

<Other Modifications>

According to the first embodiment, as shown in FIG. 3, each of the requester hosts 11 and the participant hosts 11a, etc., has the user cluster definition table 24. The embodiment of the present invention is not, however, limited to this scheme. For instance, the viral search site 10 may create the user cluster definition table 24, and the administration host may retain the table 24 as it is. The viral search site 10 may retain the user cluster definition tables 24 of the individual participant members, wherein the registration numbers for identifying the participant members are used as keys.

Then, when the requester P makes a request for the query, the registration number may be transferred to the viral search site 10. The viral search site 10 searches for, based on the registration number thereof, the user cluster definition table 24 of this requester P, thus obtaining the cluster number thereof.

According to the embodiment discussed above, the query is created on the homepage of the viral search site 10. The embodiment of the present invention is not, however, limited to such a procedure.

For example, the information processing program downloaded from the viral search site 10 may be provided with a user interface (UI) for the user to input a query theme, and this may be transmitted to the viral search site 10.

Moreover, the query may also be created in a predetermined format by use of a normal text editor, a spreadsheet or a word processor, etc. In this case, the query, i.e., the requester query may be delivered by E-mail to the viral search site 10. Further, the recommendation information created by totaling the answers may also be sent by E-mail back to the requester host 11 from the viral search site 10.

In the system according to the embodiment discussed above, the answers to the query are directly gathered. The embodiment of the present invention is not, however, limited to such a procedure. For instance, a location of a file stored with the answers, e.g., the on-the-network address of the participant host 11a, etc., with the answer hit and a file name of the file thereof, may also be collected on the viral search site 10 or the requester host 11.

Then, the viral search site 10 or the requester host 11 may download the file from the participant host 11a, etc.

According to the embodiment discussed above, the requester P invokes the homepage of the viral search site 10 and inputs the query theme, i.e., the wish-to-search-for item and the search content as well. The embodiment of the present invention is not, restricted to such a procedure.

For example, the requester P may, on the requester terminal 11, create the query by utilizing the text creation programs such as the text editor, the word processor program, the spreadsheet program and so on. The requester P creates those queries based on a predetermined form and may transmit them by e-mail, etc., to the viral search site 10.

Further, in the embodiment discussed above, the requester P executes the initial setting based on the information processing program downloaded from the homepage of the viral search site 10, and inputs the self consumption characteristics and the evaluation of the commercial article, etc. (the processes in FIG. 10). The embodiment of the present invention is not, however, confined to such a procedure.

For instance, in the initial setting based on the information processing program downloaded from the homepage of the viral search site, there may be designated an area for accumulating the self consumption characteristics and the commercial article evaluation, e.g., a folder, etc., within the hard disk 14. Then, the requester P may input the self consumption characteristics and the commercial article evaluation, etc., in this area by use of the text creation programs such as the text editor, the word processor program, the spreadsheet program and so forth.

In the embodiment discussed above, the TTL is used for restricting the limitless query forwarding. The embodiment of the present invention is not, however, confined to this scheme. For instance, there may be taken such a scheme that an initial distribution time is set in the site query, and the query with an elapse of a predetermined time since this initial distribution time is discarded. There may further taken a scheme, wherein an effective period is set in the site query, and the query with an expiration of this effective period is discarded.

False answers sent back may be detected, and the filtering for eliminating these false answers may be executed. This scheme may be performed by accumulating a history of the answers during a predetermined period for every participant member and judging a consistency of the answers.

Second Embodiment

A second embodiment of the present invention will be described with reference to the drawings in FIGS. 24 through 26. According to the first embodiment, the requester P makes the request for the search via the viral search site from on the requester host 11. There will be explained an information management system in the second embodiment, wherein the requester makes the request from on the requester host 11 without through the viral search site 10, and the answers are collected.

Other configurations and operations in the second embodiment are the same as those in the first embodiment. Such being the case, the same components are marked with the same symbols, and their explanations are omitted. Further, the drawings in FIGS. 1 through 23 are referred to according to the necessity.

<Outline of Functions>

Figure 24:
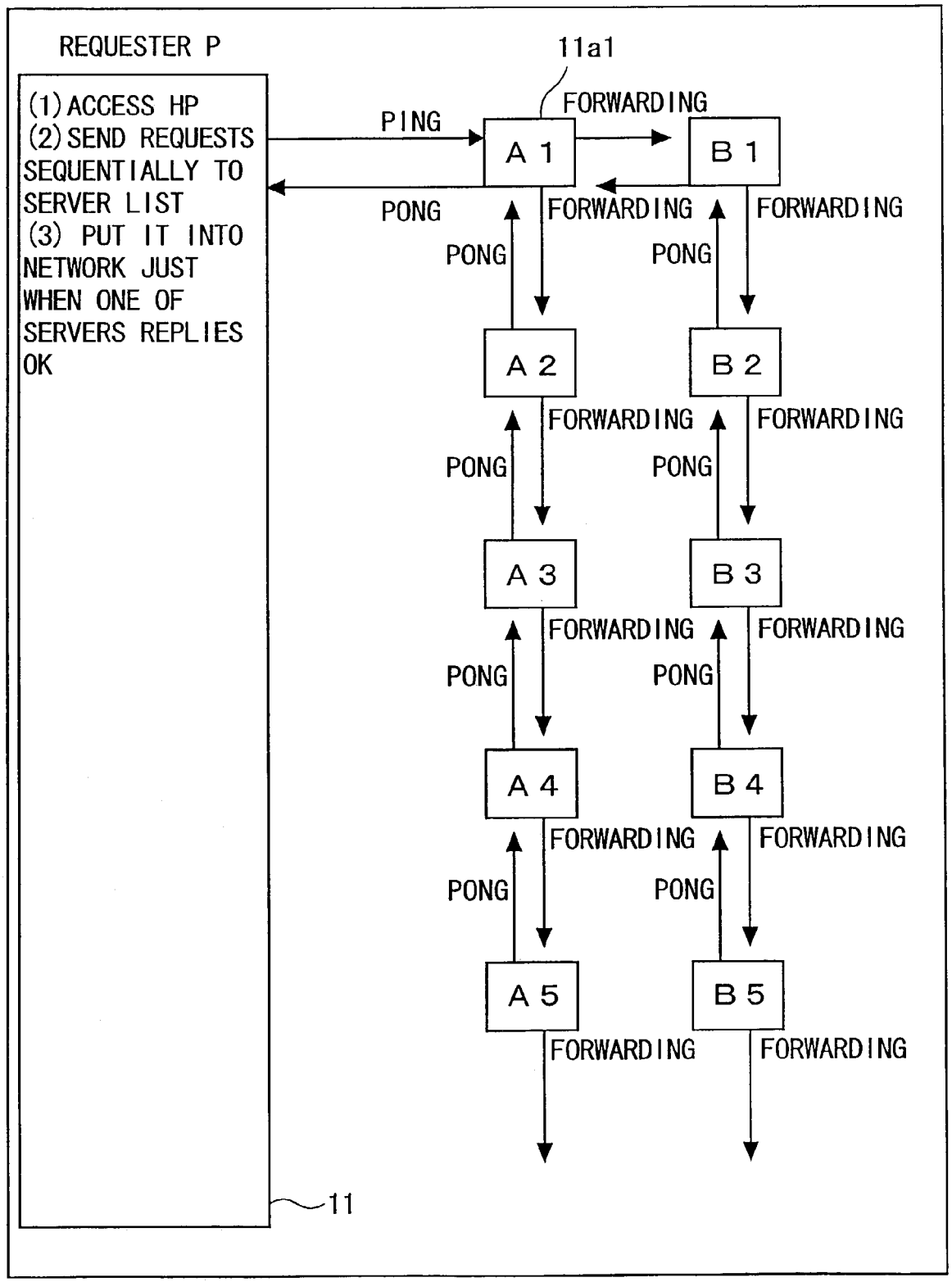
FIG. 24 is a diagram showing a control flow for establishing connections in the information management system in a second embodiment.

FIG. 24 is a diagram showing a control flow for establishing a connection with each of participant hosts 11a1, etc. The connection implies a relationship showing a connection sequence with the participant host 11a1, etc., that is requested to search, i.e., queried by the requester host 11.

(1) To start with, the requester P accesses a predetermined homepage from on the requester host 11 and acquires a server list, i.e., a list of the participant hosts 11a1, etc.

(2) The requester P delivers from the requester host 11 a message for searching out a host acceptable of a search request on the network. This type of message is already known as "ping" in "Gnutella" defined as a protocol for searching through TCP/IP-based distributed databases.

This ping is forwarded sequentially across the hosts on the network. Among the hosts receiving ping, the host capable of responding to the search request sends, back to the requester host, a self-address on the network, a file count of files sharable with other hosts on the network and a whole data size of the files. This reply is known as "pong" in the Gnutella protocol described above. This pong is transmitted tracing the forwarding route back to the requester host 11.

The Gnutella protocol is described on a homepage, e.g., "http://www.Gnutella.org, etc., on the Internet. In this embodiment, however, the host search is not limited to the procedure defined in Gnutella.

(3) The requester host, just when receiving the reply (pong) from any one of the hosts, enters the network (that is a link of the participant hosts 11a1, etc.) built up the participant hosts described above, and can make the search request.

Figure 25:
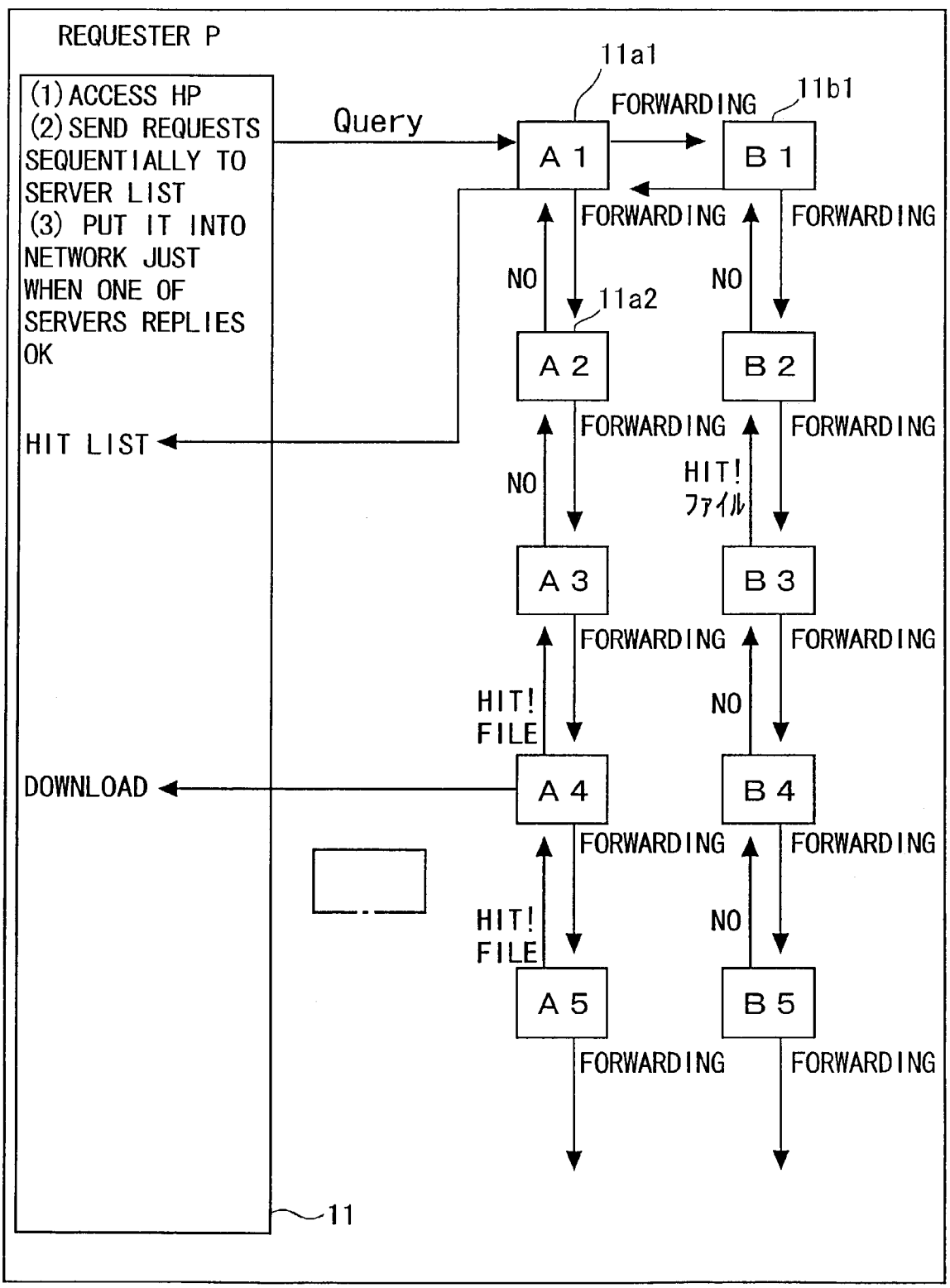
FIG. 25 shows steps of obtaining an answer in the information management system in the second embodiment.
Figure 26:
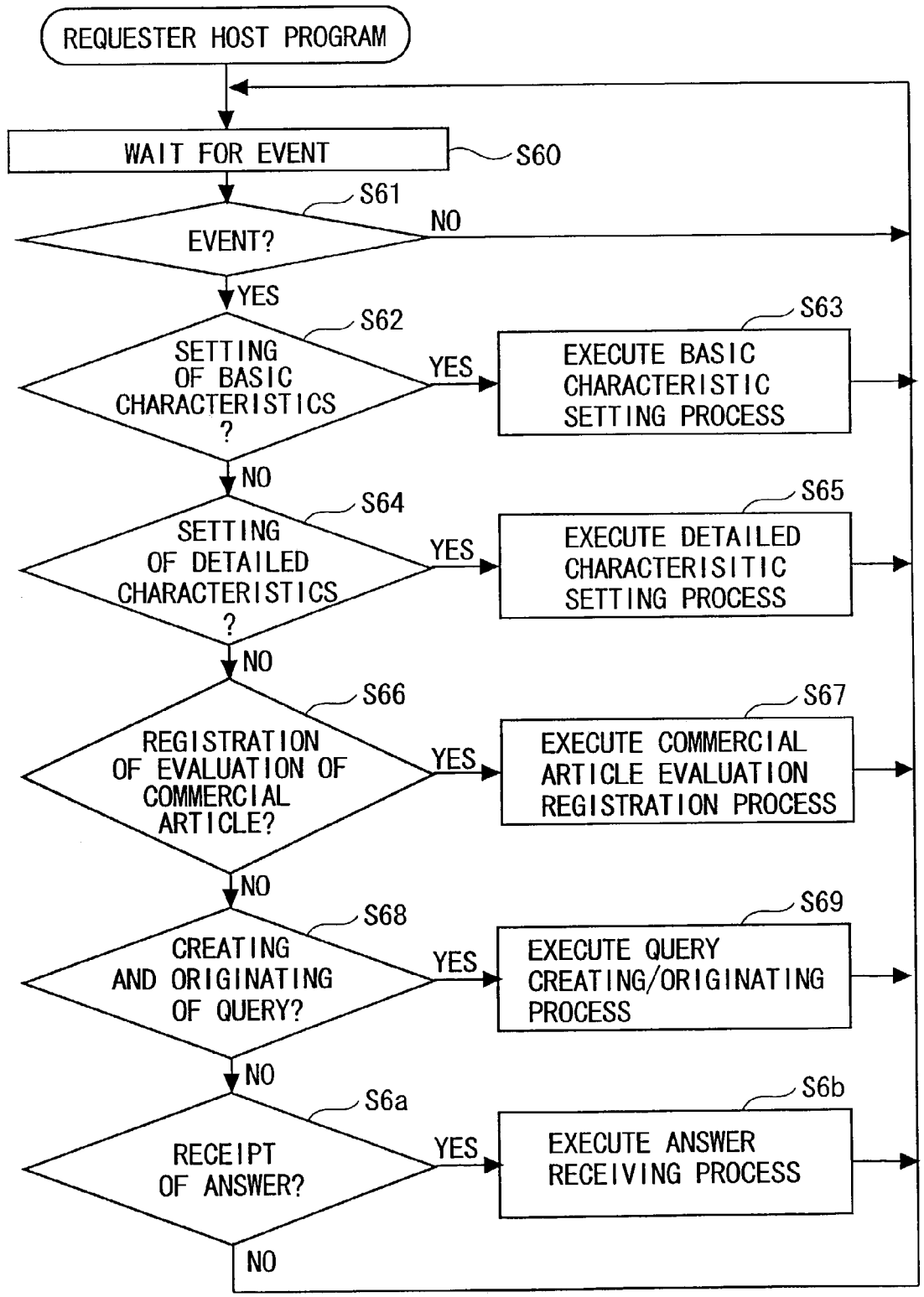
FIG. 26 is a flowchart showing processes of the requester host in the second embodiment.

FIG. 25 shows a procedure for obtaining the answer by making a request for query to the link of the participant hosts 11a1, etc., which is built up in the procedure in FIG. 24. This query message is known as "query" according to the Gnutella protocol.

Herein, a content of the query is, as in the first embodiment, the question of "What is a degree of satisfaction with the commercial article X ?", and so forth. Further, each of the participant hosts 11a1, etc., stores, as in the first embodiment, the consumption characteristics of the participant members A, etc., and the questionnaire files, etc., on the hard disk 14 of each of the participant hosts 11a1, etc.

The requester host 11 makes the query request to the participant hosts 11a1, etc., found out based on the procedure in FIG. 24. Then, the participant host 11a1, etc., searches for an answer to this query on the self hard disk 14.

Moreover, the participant host 11a1, etc., decrements the TLL by 1 and judges whether the TTL is larger than 0 or not. Then, the participant host 11a1, etc., if the TTL is larger than 0, forwards this query to the participant hosts 11a2, 11b1, etc., that are linked to the host 11a1 itself.

The query is thus sequentially forwarded till the TTL comes to 0. On the other hand, the participant host 11a1 etc., to which the query is thus forwarded, when detecting the answers to this query, sends back to the forwarding source of the search request the on-the-network address of the participant host 11a1, etc., the file count of the files recorded with these answers, sizes of the respective files and file names. This reply is known as "query hit" in the Gnutella protocol.

Thus, the requester host 11 consecutively gathers locations of the files stored with the answers to the search requests.

The requester host 11 downloads the answers to the search request in accordance with the addresses of the participant hosts with the information thus collected and the file names. The processes such as filtering and totaling those answers and creating the recommendation information are the same as those in the first embodiment, and hence their explanations are omitted.

As described above, the information processing system in the second embodiment can be configured without the operating company existing as the viral search site 10 exemplified in the first embodiment.

<Operation>

Processing steps of the information processing program executed by the CPU 12 of the requester host 11 in this embodiment, will be explained referring to FIG. 26. The CPU 12 executes this information processing program, thereby providing a function as the requester host 11.

The CPU 12 is, during the execution of this information processing program, in a wait-for-event status (S60, S61). When an event occurs, the CPU 12 judges a category of the event.

At first, the CPU 12 judges whether or not the event is to set the basic characteristics (S62). The basic characteristics are defined as so-called demographic data such as an address (or a post code), an age, a distinction of sex, a job and so on.

If the event is the setting of the basic characteristics, the CPU 12 executes a basic characteristic setting process (S63). In this process, an unillustrated basic characteristic setting screen is displayed, and the requester P is therefore able to set the requester's own basic characteristics. Thereafter, the CPU 12 returns the control to S60.

Whereas if not the setting of the basic characteristics, the CPU 12 judges whether or not the event is to set detailed characteristics (S64). The detailed characteristics are defined as so-called psychographic data such as a taste, an opinion, a favorite brand and so forth.

If the event is the setting of the detailed characteristics, the CPU 12 executes a detailed characteristic setting process (S65). In this process, an unillustrated detailed characteristic setting screen is displayed, and the requester P is therefore able to set the requester's own detailed characteristics. Thereafter, the CPU 12 returns the control to S60.

Whereas if not the setting of the detailed characteristics, the CPU 12 judges whether or not the event is a registration of a commercial article evaluation (S66).

If the event is the registration of the commercial article evaluation, the CPU 12 executes a commercial article evaluation registering process (S67). In this process, an unillustrated commercial article evaluation registering screen is displayed, and the requester P is therefore able to set an evaluation, a degree of satisfaction, etc., of the commercial article used by the requester himself or herself. Thereafter, the CPU 12 returns the control to S60.

Whereas if not the registration of the commercial article evaluation, the CPU 12 judges whether or not the event is to create a query and to transmit this query (S68).

If the event is the creation of the query and the transmission thereof, the CPU 12 executes a query creating/transmitting process (S69). In this process, an unillustrated query creating/transmitting screen is displayed, and the requester P is therefore able to set a desired theme, e.g., a specified commercial article and a degree of satisfaction with this commercial article. Then, the requester can transmit a content of the query as it is. Thereafter, the CPU 12 returns the control to S60.

Whereas if not the creation of the query and transmission thereof, the CPU 12 judges whether or not the event is a receipt of the answer (S6*a*).

If the event is the receipt of the answer, the CPU 12 executes an answer receiving process (S6*b*). In this process, the CPU 12 checks whether or not the answer is received in an unillustrated mail box. Then, the CPU 12, if the answer is received therein, executes a totaling process. This totaling process includes the filtering process. The steps of the totaling process and the filtering process are the same as those in the first embodiment, and hence their explanations are omitted.

As discussed above, the system in the second embodiment is capable of collecting the answers to the query without the viral search site 10.

Modified Example

According to the system in the second embodiment, the requester host collects the locations of the files retaining the answers. The embodiment of the present invention is not, however, limited to such a procedure. For instance, the answer itself to the query, e.g., an answer that "the degree of satisfaction with the commercial article X is 9" may be sent back.

Third Embodiment

A third embodiment of the present invention will be described with reference to FIGS. 27 and 28. In the first and second embodiments, there has been explained the information management system for collecting the information about the query such as "What is a degree of satisfaction of the purchaser of the commercial article X ?", and for creating the recommendation information of the commercial article.

The third embodiment will discuss an information management system for collecting the information used for a member subscribing a commercial article sales site to sell a commercial article.

The commercial article sales site in the third embodiment accepts an offer of selling or purchasing the commercial article from the requester P. Then, this commercial article sales site distributes a query to the participant host 11*a*1, etc., with respect to the offered commercial article.

The participant host 11*a*1, etc., retains a commercial article that the participant member A, etc., desired to purchase, a desired purchase price thereof, a desire-to-sell commercial article and a desired sale price thereof. Then, when the query described above is distributed, each of the participant hosts 11*a*, etc., judges whether or not the query target commercial article is coincident with the self-retained desired purchase price or desire-to-sell commercial article. Then, if coincident, each of participant hosts 11*a*, etc., sends back a response.

Thus, the third embodiment is different from the first and second embodiments in terms of such a point that the query theme is the offer of selling or purchasing the commercial article. The configuration and the operation of the commercial article sales site are the same as those of the viral search site 10 in the first embodiment. Such being the case, the drawings in FIGS. 1 through 26 are referred to according to the necessity.

<Outline of Functions>

The member subscribing the commercial article sales site records the desired purchase price of the desired commercial article in the self participant host 11*a*, etc. Corresponding to this, the person desiring to sell the commercial article offers a sale of the commercial article.

The commercial article sales site adds up the desired purchase prices of the commercial article concerned, which are recorded in the respective participant hosts 11*a*, etc., by the participant members A, etc. Then, the commercial article sales site selects the member who desires to purchase it at the highest price, and presents it to the person desiring to sell the commercial article.

Further, the member subscribing the commercial article sales site records a desired sale price of a stock commercial article on hand in the self participant host 11*a*, etc. Corresponding to this, the person desiring to purchase the commercial article offers a purchase of the commercial article.

The commercial article sales site adds up the desired sale prices of the commercial article concerned, which are recorded in the respective participant hosts 11*a*, etc., by the members. Then, the commercial article sales site selects the member who desires to sell it at the lowest price, and presents it to the person desiring to purchase the commercial article.

<Operation and Effect>

Figure 27:
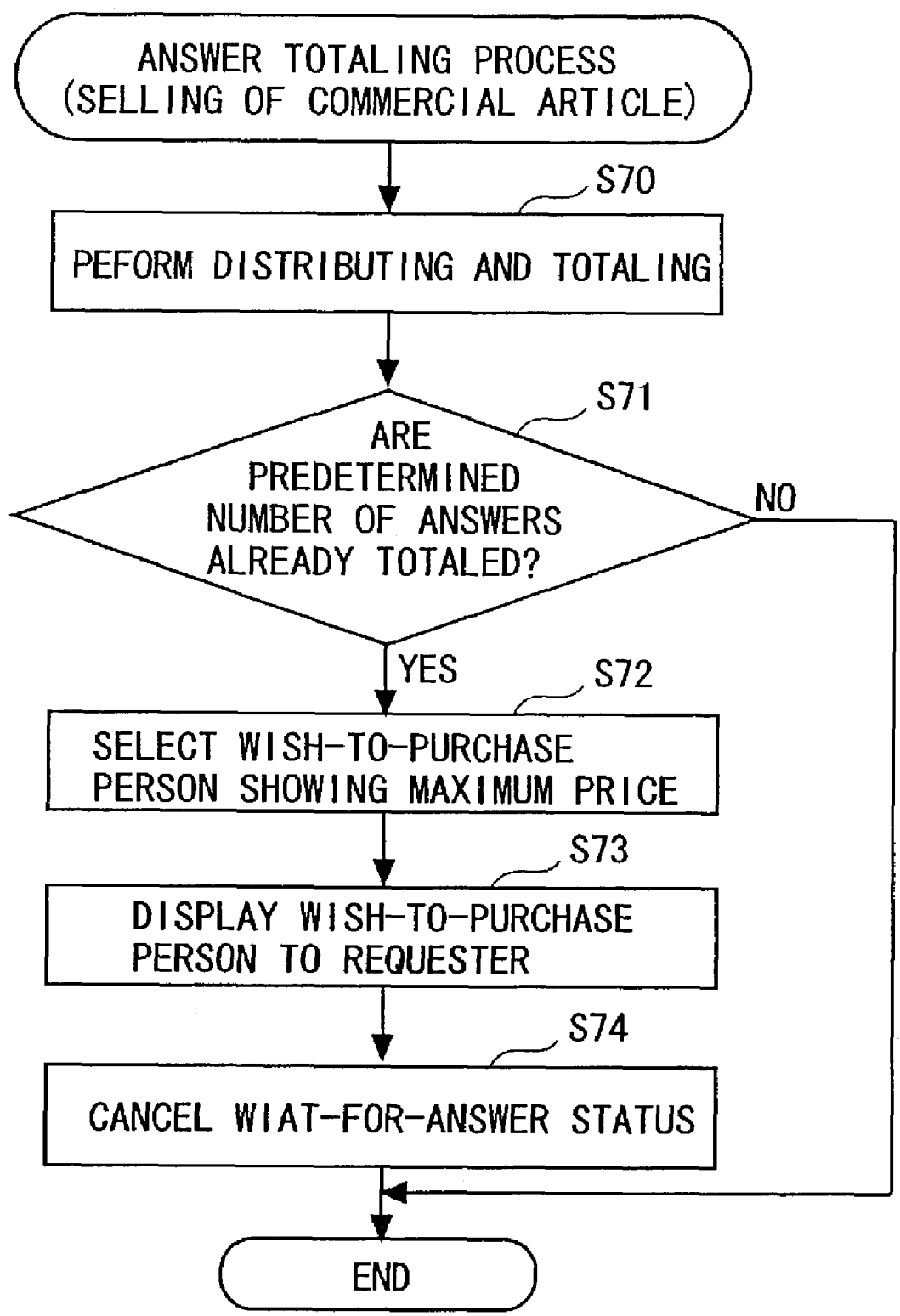
FIG. 27 is a flowchart showing an answer totaling process when selling a commercial article in a third embodiment.

FIG. 27 is a flowchart showing processes when selling the commercial article. The unillustrated administration host for administering the commercial article sales site executes the processes in FIG. 27 and supports the sales of the commercial articles.

To begin with, the administration host distributes the query to each of the participant hosts 11*a*, etc., and totals the desired purchase prices of the commercial article concerned (S70). The distribution process and the totaling process are the same as those in FIGS. 15 and 16 in the first embodiment, and hence their explanations are omitted.

Next, the administration host judges whether or not the totaling of a predetermined number of answers is finished (S71). If the totaling of the predetermined number of answers is not finished, the administration host terminates the answer totaling process. Upon terminating this process, as in the first embodiment, there comes to the wait-for-event status. Accordingly, the wait-for-answer status continues.

When judging in S71 that the totaling of the predetermined number of answers is finished, the administration host selects the person desiring to purchase the commercial article at the maximum price from the collected answers (S72).

Next, the administration host displays the desire-to-purchase person to the desire-to-sell person (S73). Subsequent to this, the desire-to-sell person may inform the desire-to-purchase person of an acknowledgement of selling the commercial article.

Next, the administration host cancels the wait-for-answer status (S74). Thereafter, the administration host finishes the answer totaling process.

Figure 28:
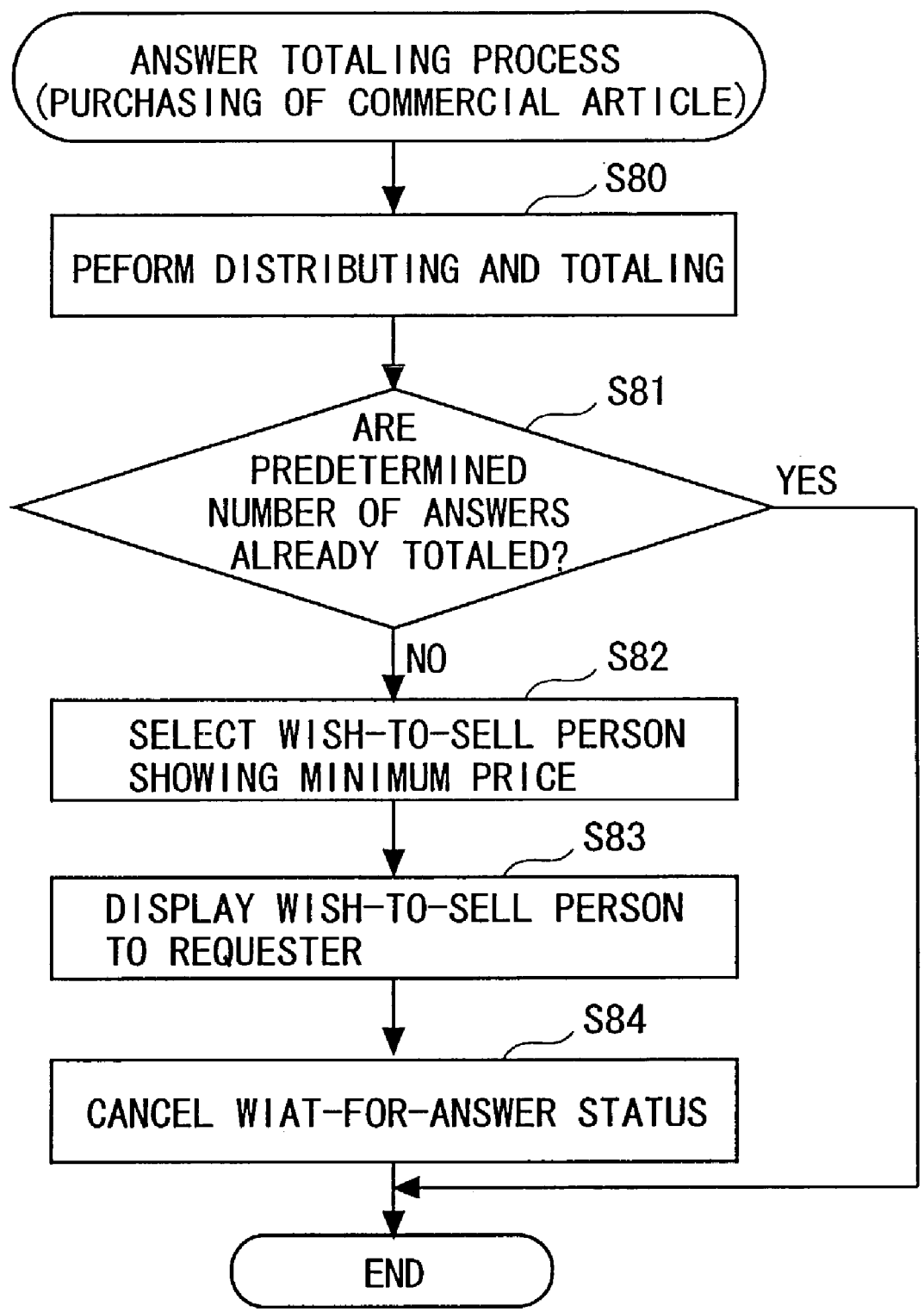
FIG. 28 is a flowchart showing an answer totaling process when purchasing the commercial article in the third embodiment.

FIG. 28 is a flowchart showing processes when purchasing the commercial article. The unillustrated administration host administering the commercial article sale site executes processes in FIG. 28 and supports the purchase of the commercial article.

To begin with, the administration host distributes the query to each of the participant hosts 11a, etc., and totals the desired sale prices of the commercial article concerned (S80).

Next, the administration host judges whether or not the totaling of a predetermined number of answers is finished (S81). If the totaling of the predetermined number of answers is not finished, the administration host terminates the answer totaling process. Upon terminating this process, as in the first embodiment, there comes to the wait-for-event status. Accordingly, the wait-for-answer status continues.

When judging in S81 that the totaling of the predetermined number of answers is finished, the administration host selects the person desiring to sell the commercial article at the minimum price from the collected answers (S82).

Next, the administration host displays the desire-to-sell person to the desire-to-purchase person (S83). Subsequent to this, the desire-to-purchase person may inform the desire-to-sell person of an acknowledgement of purchasing the commercial article.

Next, the administration host cancels the wait-for-answer status (S84). Thereafter, the administration host finishes the answer totaling process.

As discussed above, the information management system in the third embodiment is capable of searching for the member who desires to purchase the commercial article at the maximum price for the desire to sell the commercial article. Moreover, it is possible to search for the member desiring to sell the commercial article at the minimum price for the desire to purchase the commercial article.

Further, according to this system, the desired purchase prices of all the members subscribing the commercial article sale site are collected just when the offer of selling the commercial article is given. Accordingly, the person desiring to sell the commercial article has no necessity of waiting for the desire-to-purchase person to answer, and the sale of the commercial article can be promoted without taking any informational synchronization with the desire-to-purchase person.

Further, this desire-to-purchase person simply records the desired purchase price on the hard disk 24, etc., of the self participant host 11a, and the administration host properly collects the desires for the purchase. Accordingly, the desire-to-purchase person is not required to see the commercial article sales site. The effects described above are the same also when the desire-to-purchase person of the commercial article offers the purchase of the commercial article.

<Modified Example>

In the embodiment discussed above, in the answer totaling process, the desire-to-purchase person presenting the maximum price or desire-to-sell person presenting the minimum price is selected. The embodiment of the present invention is not, however, limited to such a procedure.

For instance, among the desire-to-purchase persons, a predetermined number of persons may be selected in sequence of the desired purchase price from the highest to the lowest and displayed to the requester P. Further, among the desire-to-sell persons, a predetermined number of persons may be selected in sequence of the desired sell price from the lowest to the highest and displayed to the requester P.

The embodiment discussed above has exemplified the sale and the purchase of the commercial article in the information management system for managing the information in distribution. The utilization of this information management system is not confined to such an object.

For example, this information management system may be utilized for monitors for the commercial articles and services. Namely, the member registered on the monitor records degrees of satisfaction with the commercial article and the service on the hard disk of host 11a, etc., of participant himself.

Further, for example, impressions, etc., about TV programs are recorded in a predetermined format. A monitor sponsor may make periodic queries about monitor results thus recorded in distribution and may collect these monitor results.

Further, this information management system can be utilized for gathering contribution articles to magazines and newspapers. For instance, a magazine publishing company and a newspaper publishing company recruit reader correspondents. The reader correspondent is registered on an unillustrated administration host.

The reader correspondent registered thereon records a self-writing work and a contribution article on the hard disk 14 everyday. The magazine publishing company and the newspaper publishing company distribute queries related to necessary themes as the necessity arises, and may collect the articles matching with these themes.

With this scheme, the magazine publishing company and the newspaper publishing company can gather the necessary articles when required. The reader correspondents with their articles adopted are paid fees.

Fourth Embodiment

A fourth embodiment of the present invention will be described with reference to FIGS. 29 and 30. The first through third embodiments discussed above have dealt with the information management system for collecting the information by forwarding the query to among the participant hosts that are peer-to-peer-connected with each other.

In the fourth embodiment, an information management system for multicasting the query will be explained. The procedures other than multicasting are the same as those in the first through third embodiments. Such being the case, the drawings in FIGS. 1 through 28 are referred to according to the necessity.

<Application of Multicasting Communication>

The multicast is known as a technology of simultaneously transmitting the data to a multiplicity of receiving hosts from one transmitting host. The multicast involves using multicast addresses.

When the transmitting host transmits the data to the multicast addresses, all the receiving hosts recognizing these multicast addresses as their own addresses, receive the data.

This type of multicast addresses are assigned beforehand when recruiting subscribers for the multicast addresses. According to the information management system in the fourth embodiment, the hosts 11a, etc., utilized by the participant members A, etc., are categorized into a plurality of groups, and each group is assigned a multicast address.

The unillustrated administration host records the number of the members of each group and the multicast addresses of the groups in a management table on the memory 13. The administration host, when requested to distribute a query, forwards this query to a predetermined number of multicast addresses in a predetermined sequence. With this scheme, the query is multicast to the respective subscribers, and the subscribers having information coincident with the query send answers back to the administration host.

<Operation and Effect>

Figure 29:
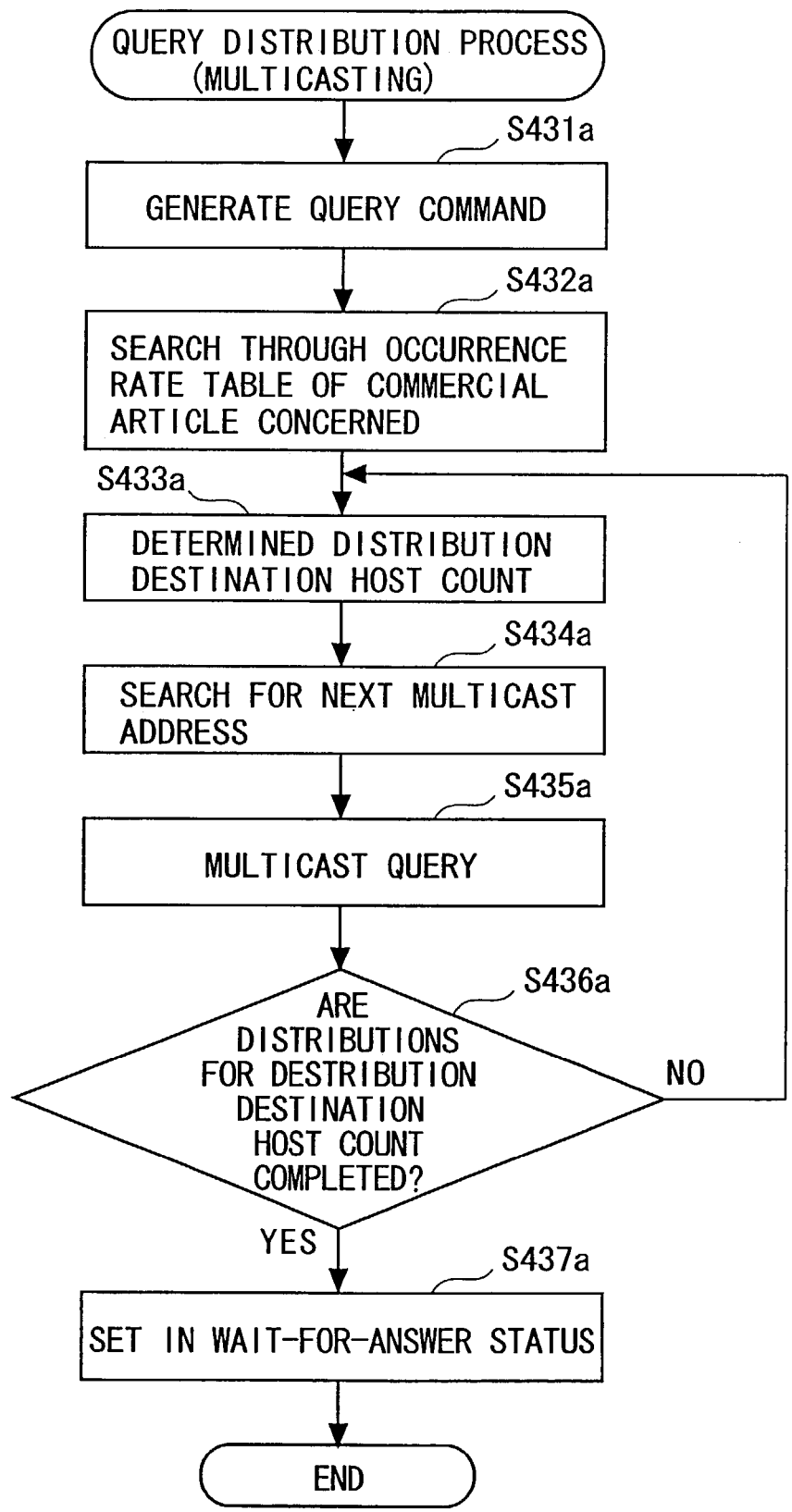
FIG. 29 is a flowchart showing a multicasting-based query distribution process in a fourth embodiment.
Figure 30:
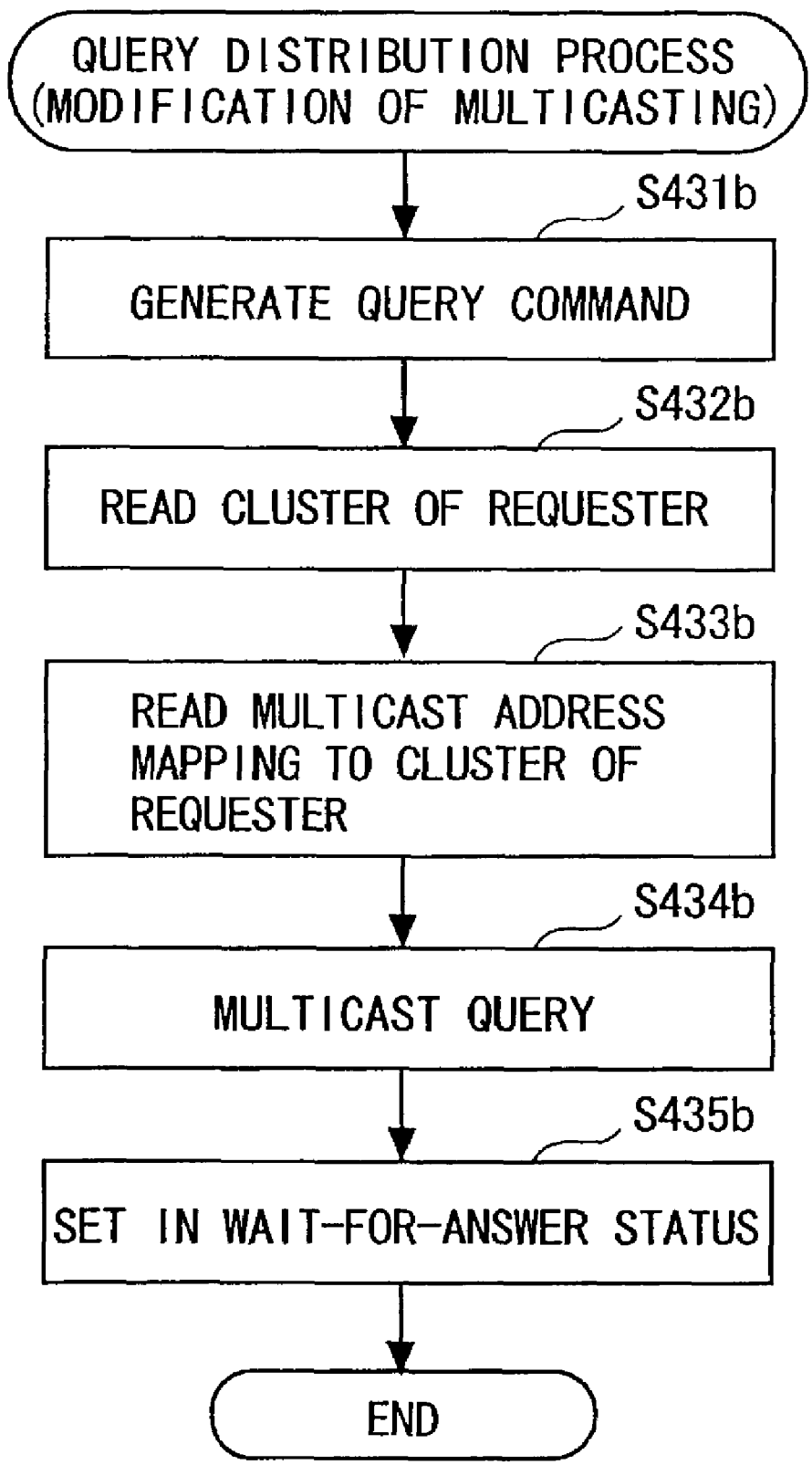
FIG. 30 is a flowchart showing the distribution process in a modified example of the fourth embodiment.

FIG. 29 shows a multicast-based query distribution process. The administration host executes the process shown in FIG. 29, thereby providing a distribution function.

At first, the administration host generates a query command (S431a). This query command, unlike the site query command exemplified in the first embodiment, does not require the query ID. The reason is that the data are transmitted to the subscribers having the specified multicast addresses, and hence it does not happen that the same query is redundantly sent to the single subscriber.

Next, the administration host searches for an occurrence rate of a query target commercial article in the occurrence rate table 21 (S432a).

Subsequently, the administration host determines a distribution destination host count (S433a). For example, the distribution destination host count is determined by the following (Formula 2).

Distribution Destination Host count=Predetermined Collection Sample Count×Occurrence Rate× Coefficient   (Formula 2)

Herein, the predetermined collection sample count, the occurrence rate and the coefficient are the same as those in (Formula 1) in the first embodiment, and hence their explanations are omitted.

Subsequently, the administration host searches for the multicast address in the predetermined sequence from the management table recorded on the memory 13 (S434a).

Next, the administration host multicasts the query to the multicast address (S435a).

Ensuingly, the administration host judges whether or not the distributions corresponding to a distribution destination count are completed (S436a). If the distributions corresponding to the distribution destination count are not yet completed, the administration host sets the control back to S433a. A next multicast address is thereby searched for, and the multicasting is further repeated.

Whereas if the distributions corresponding to the distribution destination count are completed, the administration host sets the wait-for-answer status. At this time, there are recorded the address of the requester host 11 originating the query, the multicast address used and a total number of the hosts to which the query is distributed.

Note that a response to the multicasting is sent back to the administration host from the answerer host through one-to-one communications based on the normal communication protocol such as TCP/IP, etc. This response may be received by, e.g., an E-mail and may also be received as a file in a predetermined area on the hard disk 14 by utilizing FTP (File Transfer Protocol).

As discussed above, according to the information management system in the fourth embodiment, the query of the requester P is multicast from the administration host directly to the subscriber terminals 11a, etc. Therefore, the host 11a, etc., has no necessity of managing the redundant query involving the use of the query ID.

Moreover, according to the present information management system, the subscriber hosts 11a, etc., are categorized into the groups and thus managed, and this scheme therefore has a good affinity to the multicast address. The administration host is capable of managing the subscriber groups on the basis of the multicast addresses.

<Modified Example>

In the fourth embodiment, the administration host categorizes the subscribers into the groups and assigns the multicast addresses to these groups. The group is set irrespective of subscriber's characteristics. This group may be set associative with, e.g., the clusters into which the subscribers are categorized with respect to the respective commercial articles. The concept of the cluster is the same as in the first embodiment, and therefore its explanation is omitted.

The query distribution process in the case of categorizing the subscribers into the clusters and assigning the multicast addresses to the clusters, will be described referring to FIG. 30.

To start with, the administration host generates the query command (S431b). Next, the administration host prompts the requester P to input a cluster number of the requester P with respect to the query target commercial article (S432b).

Subsequently, the administration host searches for the multicast address mapping to the cluster of the requester P (S433b). Ensuingly, the administration host multicasts the query to this multicast address (S4342).

Next, the administration host sets the wait-for-answer status (S435b). Thereafter, the administration host terminates the process.

As discussed above, according to this information management system, the consumers are grouped into the clusters set for every commercial article, and the multicast addresses are assigned to the groups. This scheme, with respect to the query target commercial article, enables the query to be distributed simply surely to the subscribers coming under the same cluster as that of the requester P, whereby the answers each exhibiting a high reliability can be obtained.

<<Readable-by-Computer Recording Medium>>

The information processing program in each of the embodiments discussed above can be recorded on a readable-by-computer recording medium. Then, the computer reads and executes the information processing program on this recording medium, whereby the computer can be made to function as the host explained in the embodiments discussed above.

Herein, the readable-by-computer recording medium includes recording mediums capable of storing information such as data, programs, etc., electrically, magnetically, optically and mechanically or by chemical action, which can be all read by the computer. What is demountable out of the computer among those recording mediums may be, e.g., a floppy disk, a magneto-optic disk, a CD-ROM, a CD-R/W, a DVD, a DAT, an 8 mm tape, a memory card, etc.

Further, a hard disk, a ROM (Read Only Memory) and so on are classified as fixed type recording mediums within the computer.

<<Data Communication Signal Embodied in Carrier Wave>>

Furthermore, the information processing program described above can be stored on the hard disk and the memory of the computer, and downloaded to other computers via communication media. In this case, the program is transmitted as data communication signals embodied in carrier waves via the communication media. Then, the computer downloaded with this program can be made to function as the program developing device 1 in the embodiments discussed above.

Herein, the communication media may be any one of a coaxial cable, a twisted pair cable, an optical communication cable, satellite communications, ground wave wireless communications, etc.

Further, the carrier waves may be DC signals, and the data communication signal embodied in the carrier wave may be any one of a modulated broadband signal and an unmodulated base band signal.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A readable-by-computer storage medium having a program stored therein for making a computer execute steps of:
   receiving a query having a designated theme from a first computer connected to a network, the theme being a user's evaluation about a commercial article, the query containing personal characteristic information of a query originator user related to a purchase of the commercial article, the query also containing transfer control information for controlling transferability of the query;
   searching for information coincident with the query, the information, inputted by a respondent user, including an evaluation about a commercial article, the evaluation being associated with the respondent user having associated personal characteristics;
   referring to the personal characteristics of a respondent user,
   judging whether the respondent user is coincident with the query originator user based upon a comparison of the personal characteristic information of the query originator user and the personal characteristics of the respondent user, wherein said computer is made to execute the judging step without online assistance and without feedback information not induced by an active intention of the query originator user;
   updating the transfer control information under a predetermined condition;
   judging based on the transfer control information whether the transfer of query can be permitted or not;
   transferring, when the transfer is permitted, the query to one or more second computers; and
   sending the information coincident with the query to a predetermined response destination, the information excluding an evaluation of a respondent user who is judged not coincident with the query originator user when comparing the personal characteristics,
   whereby said computer manages the information in distribution.

2. A readable-by-computer storage medium having a program according to claim 1 stored therein, wherein said computer is made to further execute a step of inputting information on a desired theme or defining an accumulation area for inputting the information on the desired theme.

3. A readable-by-computer storage medium having a program stored therein for making a computer execute steps of:
   receiving a query having a designated theme from a first computer connected to a network, the theme being a user's evaluation about a commercial article, the query containing personal characteristic information of a query originator user related to a purchase of the commercial article, the query also containing transfer control information for controlling transferability of the query;
   searching for information coincident with the query, the information, inputted by a respondent user, including an evaluation about a commercial article, the evaluation being associated with the respondent user having associated personal characteristics;
   referring to the personal characteristics of a respondent user, and judging whether the respondent user is coincident with the query originator user based upon a comparison of the personal characteristic information of the query originator user and the personal characteristics of the respondent user, wherein said computer is made to execute the judging step of without online assistance and without feedback information not induced by an active intention of the query originator user;
   updating the transfer control information under a predetermined condition;
   judging based on the transfer control information whether the transfer of query can be permitted or not;
   transferring, when the transfer is permitted, the query to one or more second computers; and
   sending a location of the information coincident with the query to a predetermined response destination, the information excluding an evaluation of a respondent user who is judged not coincident with the query originator user when comparing the personal characteristics,
   whereby said computer manages the information in distribution.

4. A readable-by-computer storage medium having a program according to claim 1 stored therein, wherein said computer is made to further execute steps of:
   receiving the response to the query from said second computer; and
   sending the received response back to said first computer.

5. A readable-by-computer storage medium having a program according to claim 1 stored therein, wherein the response destination is said first computer.

6. A readable-by-computer storage medium having a program according to claim 1 stored therein, wherein the query contains information for specifying the response destination, and
   the response destination is a query originator computer originating the query first.

7. A readable-by-computer storage medium having a program according to claim 1 stored therein, wherein the response destination is an administration computer requested to distribute the query to said other computer by the query originator computer originating the query first, and starting such a distribution.

8. A readable-by-computer storage medium having a program according to claim 1 stored therein, wherein said computer is made to further execute the step of:
   generating the query.

9. A readable-by-computer storage medium having a program according to claim 8 stored therein, wherein said computer is made to further execute a step of requesting an administration computer to start distributing the thus generated query.

10. A readable-by-computer storage medium having a program according to claim 9 stored therein, wherein said receiving step involves receiving the response from said administration computer.

11. A readable-by-computer storage medium having a program according to claim 8 stored therein, wherein said receiving step involves receiving the response from a computer having information coincident with the query.

12. A readable-by-computer storage medium having a program according to claim 8 stored therein, wherein said computer is made to further execute a step of
totaling the responses.

13. A readable-by-computer storage medium having a program according to claim 1 stored therein, wherein the query is an offer of selling a specified commercial article, and
the information is a price in the case of purchasing the commercial article concerned.

14. A readable-by-computer storage medium having a program according to claim 13 stored therein, wherein said computer is made to further execute steps of:
generating the query;
receiving a response to the query; and
selecting only a predetermined number of responses in sequence from the highest price down to the lowest.

15. A readable-by-computer storage medium having a program according to claim 1 stored therein, wherein the query is an offer of purchasing a specified commercial article, and
the information is a price in the case of selling the commercial article concerned.

16. A readable-by-computer storage medium having a program according to claim 15 stored therein, wherein said computer is made to further execute steps of:
generating the query;
receiving a response to the query; and
selecting only a predetermined number of responses in sequence from the lowest price to the highest.

17. A readable-by-computer storage medium having a program stored therein for making a computer distribute a query to another computer on a network and execute steps of:
receiving a query distribution request for distributing the query to another distribution destination computer from a query originator computer generating the query related to a desired theme of a result of a user's evaluation about a commercial article;
determining said distribution destination computer;
distributing the query to said determined distribution destination computer receiving responses to the query, including distributing transfer control information for controlling transferability of the query together with the query and eliminating a limitless transfer of the query, the responses including an evaluation about a commercial article, the evaluation being associated with a respondent user having associated personal characteristics;
referring to personal characteristic information of the user of said query originator computer with respect to the commercial article;
judging whether or not a respondent user is coincident with the user of said query originator computer based upon a comparison of the personal characteristic information of the user of said query originator computer and the personal characteristics of the respondent user, wherein said computer is made to execute the judging step without online assistance and without feedback information not induced by an active intention of the user of said query originator computer;
totaling responses of the respondent users coincident with the user of said query originator computer, the responses excluding an evaluation of a respondent user who is judged not coincident with the user of said query originator computer when comparing the personal characteristics;
generating total information; and
sending the total information back to the query originator computer.

18. A readable-by-computer storage medium having a program according to claim 17 stored therein, wherein said distribution step involves distributing the query to a plurality of distribution destinations on the basis of a multicast address.

19. A readable-by-computer storage medium having a program according to claim 17 stored therein, wherein said computer is made to further execute the step of:
sending the response back to said query originator computer.

20. A readable-by-computer storage medium having a program according to claim 17 stored therein, wherein said computer is made to further execute steps of:
generating an anonymous response by deleting the information for specifying an individual from the response; and
sending the anonymous response back the query originator computer.

21. A readable-by-computer storage medium having a program according to claim 17 stored therein, wherein said distribution step involves designating said query originator computer as a response destination for said distribution destination computer, and having the response directly given to said query originator computer from said distribution destination computer or said transfer destination computer.

22. A readable-by-computer storage medium having a program according to claim 17 stored therein, wherein the query is an offer of selling a specified commercial article,
the information is a price in the case of purchasing the commercial article, and
said totaling step includes selecting only a predetermined number of responses in sequence from the highest price down to the lowest.

23. A readable-by-computer storage medium having a program according to claim 17 stored therein, wherein the query is an offer of purchasing a specified commercial article,
the information is a price in the case of selling the commercial article, and
said totaling step includes selecting only a predetermined number of responses in sequence from the lowest price to the highest.

24. An information processing device cooperating with another information processing device connected to a network, comprising:
an operation unit for creating information related to a desired theme;
a recording unit for recording said information;
a communication unit for communicating with said other information processing device connected to the network; and
a processor,
wherein said processor, when receiving a query with a theme designated from said other first information processing device, the query also with transfer control information for controlling transferability of the query, the theme being a user's evaluation about a commercial article, the query containing personal characteristic information of a query originator user related to a purchase of the commercial article, searches for information coincident with the query on said recording unit, the information, inputted by a respondent user, including an evaluation about a commercial article, the evaluation being associated with the respondent user having associated personal characteristics, wherein said processor also refers to personal characteristics of a respondent user, judges whether the respondent user is coincident with the query originator user based upon a comparison of the personal characteristic information of the query originator user and the personal characteristics of the respondent user, updates the transfer control information, judges based on the transfer control information whether the transfer of query can be permitted or not, and transfers, when the transfer is permitted, the query to one or more second information processing devices, wherein said processor also sends the information coincident with the query to a predetermined response destination, the information excluding an evaluation of a respondent user who is judged not coincident with the query originator user when comparing the personal characteristics, wherein said processor judges whether the respondent user is coincident with the query originator user without online assistance and without feedback information not induced by an active intention of the query originator user.

25. An information processing device according to claim 24, wherein said processor sends, as a substitute for the information coincident with the query, a location of the information coincident with the query.

26. An information processing device according to claim 24, wherein the query is an offer of selling a specified commercial article, and the information is a price in the case of purchasing the commercial article.

27. An information processing device according to claim 24, wherein the query is an offer of purchasing a specified commercial article, and the information is a price in the case of selling the commercial article.

28. An information processing device according to claim 24, wherein said processor generates the query and receives a response to the query.

29. An information processing device according to claim 24, wherein said processor generates the query, sets transfer control information for controlling transferability in the query and eliminates a limitless transfer of the query.

30. An information processing device cooperating with another information processing device connected to a network, comprising:

a communication unit for communicating with said other information processing device connected to the network; and a processor, wherein said processor receives a request for distribution from a query originator information processing device generating a query related to a desired theme to other distribution destination information processing device, determines said distribution destination information processing device, distributes the query to said distribution destination processing device, including distributing transfer control information for controlling transferability of the query together with the query and eliminating a limitless transfer of the query, and makes a predetermined respondent send back the information coincident with the query, wherein the information, inputted by a respondent user, includes an evaluation about the commercial article, the evaluation being associated with the respondent user having associated personal characteristics, and said processor refers to personal characteristic information of a user of said query originator information processing device with respect to the commercial article, judges whether or not a respondent user is coincident with the user of said query originator information processing device based upon a comparison of the personal characteristic information of the user of said query originator information processing device and the personal characteristics of the respondent user, and totals responses of the respondent users coincident with the user of said query originator information processing device, the responses excluding an evaluation of a respondent user who is judged not coincident with the user of said query originator information processing device when comparing the personal characteristics, wherein said processor judges whether the respondent user is coincident with the user of said query originator information processing device without online assistance and without feedback information not induced by an active intention of the user of said query originator information processing device.

31. An information processing device according to claim 30, wherein the query is an offer of selling a specified commercial article, the information is a price in the case of purchasing the commercial article, and said processor selects only a predetermined number of responses in sequence from the highest price down to the lowest.

32. An information processing device according to claim 30, wherein the query is an offer of purchasing a specified commercial article, the information is a price in the case of selling the commercial article, and said processor selects only a predetermined number of responses in sequence from the lowest price to the highest.

33. An information management processing system, configured by a plurality of information processing devices on a network, for managing information in distribution, said information processing device comprising:

a communication unit for communicating with other information processing device connected to a network; and a processor, wherein said processor receives a query with a theme designated from other first computer connected to the network, the query also with transfer control information for controlling transferability of the query, the theme being a user's evaluation about a commercial article, the query containing personal characteristic information of a query originator user related to a purchase of the commercial article, searches for information coincident with the query, the information, inputted by a respondent user, including an evaluation about a commercial article, the evaluation being associated with the respondent user having associated personal characteristics, wherein said processor also refers to personal characteristics of a respondent user, judges whether the respondent user is coincident with the query originator user based upon a comparison of the personal characteristic information of the query originator user and the personal characteristics of the respondent user, updates the transfer control information, judges based on the transfer control information whether the transfer of query can be permitted or not, and transfers, when the transfer is permitted, the query to one or more second information processing devices, wherein said processor also sends the information coincident with the query to a predetermined response destination, the information excluding an evaluation of a respondent user who is judged not coincident with the query originator user when comparing the personal characteristics, wherein said processor judges whether the respondent user is coincident with the query originator user without online assistance and without feedback information not induced by an active intention of the query originator user.

34. An information management processing system according to claim 33, wherein said communication unit communicates with other information processing device connected to the network,
   wherein said processor further includes an administration device for receiving a request for distributing a query from a query originator computer generating the query to other distribution destination computer, determining said distribution destination computer and distributing the query to said distribution destination computer.

35. An information collecting method of distributing information to a computer on a network, the computer storing information in distribution, and making said computer respond to the query, said method comprising:
   receiving a request for distribution from a query originator computer generating the query related to a desired theme about a result of a user's evaluation about a commercial article;
   determining a query distribution destination computer;
   distributing the query to said distribution destination computer, including distributing transfer control information for controlling transferability of the query together with the query and eliminating a limitless transfer of the query;
   receiving a responses to the query, the responses including an evaluation about a commercial article, the evaluation being associated with a respondent user having associated personal characteristics;
   referring to personal characteristic information of the user of said query originator computer with respect to the commercial article;
   judging whether or not a respondent user is coincident with the user of said query originator computer based upon a comparison of the personal characteristic information of the user of said query originator computer and the personal characteristics of the respondent user, wherein said judging step comprises judging whether or not a respondent user is coincident with the user of said query originator computer without online assistance and without feedback information not induced by an active intention of the user of said query originator computer;
   totaling responses of the respondent users coincident with the user of said query originator computer, the responses excluding an evaluation of a respondent user who is judged not coincident with the user of said query originator computer when comparing the personal characteristics;
   generating total information; and
   sending the total information back to the query originator computer.

* * * * *

UNITED STATES PATENT AND TRADEMARK OFFICE
CERTIFICATE OF CORRECTION

| | |
|---|---|
| PATENT NO. | : 7,499,911 B2 |
| APPLICATION NO. | : 10/406072 |
| DATED | : March 3, 2009 |
| INVENTOR(S) | : Akiyama |

It is certified that error appears in the above-identified patent and that said Letters Patent is hereby corrected as shown below:

On the Title Pg,

Item (73) Assignee: should read --DENTSU INC.--

Signed and Sealed this

Fifth Day of May, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,499,911 B2
APPLICATION NO. : 10/406072
DATED : March 3, 2009
INVENTOR(S) : Akiyama Page 1 of 1

It is certified that error appears in the above-identified patent and that said Letters Patent is hereby corrected as shown below:

On the Title Page,

(73) Assignee: name of city should read --Tokyo (JP)--.

Signed and Sealed this

Twenty-first Day of July, 2009

JOHN DOLL
*Acting Director of the United States Patent and Trademark Office*